(12) United States Patent
Okuyama et al.

(10) Patent No.: US 10,283,800 B2
(45) Date of Patent: May 7, 2019

(54) LIQUID COMPOSITION, METHOD FOR ITS PRODUCTION, AND METHOD FOR PRODUCING MEMBRANE/ELECTRODE ASSEMBLY FOR POLYMER ELECTROLYTE FUEL CELL

(71) Applicant: AGC Inc., Chiyoda-ku (JP)

(72) Inventors: Takumi Okuyama, Chiyoda-ku (JP); Satoru Hommura, Chiyoda-ku (JP); Shinji Kinoshita, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/180,186

(22) Filed: Jun. 13, 2016

(65) Prior Publication Data
US 2016/0293987 A1    Oct. 6, 2016

Related U.S. Application Data

(63) Continuation of application No. PCT/JP2015/051285, filed on Jan. 19, 2015.

(30) Foreign Application Priority Data

Jan. 20, 2014 (JP) .................................. 2014-008035

(51) Int. Cl.
| | |
|---|---|
| *H01M 4/88* | (2006.01) |
| *H01M 8/1039* | (2016.01) |
| *H01M 8/1004* | (2016.01) |
| *H01M 4/86* | (2006.01) |
| *C08L 29/10* | (2006.01) |
| *C08L 45/00* | (2006.01) |
| *H01M 4/90* | (2006.01) |
| *H01M 8/1018* | (2016.01) |

(52) U.S. Cl.
CPC .......... *H01M 8/1039* (2013.01); *C08L 29/10* (2013.01); *C08L 45/00* (2013.01); *H01M 4/8605* (2013.01); *H01M 4/88* (2013.01); *H01M 4/8828* (2013.01); *H01M 4/9008* (2013.01); *H01M 8/1004* (2013.01); *C08L 2203/20* (2013.01); *H01M 2008/1095* (2013.01); *Y02P 70/56* (2015.11)

(58) Field of Classification Search
None
See application file for complete search history.

(56) References Cited

U.S. PATENT DOCUMENTS

| | | | |
|---|---|---|---|
| 2006/0019140 A1 | 1/2006 | Kawazoe et al. | |
| 2006/0280985 A1 | 12/2006 | Toyoda et al. | |
| 2007/0104994 A1 | 5/2007 | Endoh et al. | |
| 2009/0110967 A1* | 4/2009 | Hommura | ............... C08J 5/2237 |
| | | | 429/490 |
| 2011/0027688 A1* | 2/2011 | Hommura | ........... C08F 214/182 |
| | | | 429/483 |

FOREIGN PATENT DOCUMENTS

| | | |
|---|---|---|
| CN | 103367772 A | 10/2013 |
| JP | 2006-338912 | 12/2006 |
| JP | 2008-159343 | 7/2008 |
| WO | WO 2005/124911 A1 | 12/2005 |
| WO | WO 2005/124912 A1 | 12/2005 |
| WO | WO 2011/013578 A1 | 2/2011 |

OTHER PUBLICATIONS

English Translation of International Search Report dated Mar. 10, 2015 in PCT/JP2015/051285, filed Jan. 19, 2015.

* cited by examiner

*Primary Examiner* — Yun Qian
(74) *Attorney, Agent, or Firm* — Oblon, McClelland, Maier & Neustadt, L.L.P.

(57) ABSTRACT

To provide a liquid composition capable of forming a catalyst layer that is excellent in resistance to hydrogen peroxide and peroxide radicals, can further increase the output voltage of a membrane/electrode assembly, and can maintain a high output voltage for a long period of time; a method for its production; and a membrane electrode assembly for a polymer electrolyte fuel cell using said liquid composition. Provided is a liquid composition to be used for forming a catalyst layer constituting an electrode of a membrane electrode assembly for a polymer electrolyte fuel cell, wherein the liquid composition comprises a liquid medium, a fluoropolymer (H) having sulfonic acid groups and ring structures, and trivalent or tetravalent cerium ions, and the content of the trivalent or tetravalent cerium ions is from 1.6 to 23.3 mol % to the sulfonic acid groups (100 mol %).

19 Claims, 1 Drawing Sheet

LIQUID COMPOSITION, METHOD FOR ITS PRODUCTION, AND METHOD FOR PRODUCING MEMBRANE/ELECTRODE ASSEMBLY FOR POLYMER ELECTROLYTE FUEL CELL

This application is a continuation of PCT Application No. PCT/JP2015/051285, filed on Jan. 19, 2015, which is based upon and claims the benefit of priority from Japanese Patent Application No. 2014-008035 filed on Jan. 20, 2014. The contents of those applications are incorporated herein by reference in their entireties.

TECHNICAL FIELD

The present invention relates to a liquid composition to be used for forming a catalyst layer constituting an electrode of a membrane/electrode assembly for a polymer electrolyte fuel cell, a method for its production, and a method for producing a membrane/electrode assembly for a polymer electrolyte fuel cell by using the liquid composition.

BACKGROUND ART

A polymer electrolyte fuel cell is, for example, one prepared by sandwiching a membrane/electrode assembly between two separators to form a cell and stacking a plurality of such cells. The membrane/electrode assembly comprises an anode and a cathode each having a catalyst layer, and a polymer electrolyte membrane disposed between the anode and the cathode, to face the respective catalyst layers. The catalyst layers and the polymer electrolyte membrane contain a polymer having sulfonic acid groups, as an ion exchange resin.

A reduction reaction of oxygen at the cathode of the polymer electrolyte fuel cell proceeds via hydrogen peroxide, whereby hydrogen peroxide or peroxide radicals will be formed at the cathode. Further, to the anode, oxygen molecules from the cathode are likely to be permeated through the polymer electrolyte membrane, whereby also at the anode, hydrogen peroxide or peroxide radicals may be formed. Hydrogen peroxide or peroxide radicals formed at the cathode and the anode are known to degrade the polymer having sulfonic acid groups contained in the polymer electrolyte membrane and the catalyst layer.

The following one has been proposed as a liquid composition capable of forming a catalyst layer having resistance to hydrogen peroxide or peroxide radicals.

A liquid composition which comprises a liquid medium, a fluoropolymer comprising structural units derived from tetrafluoroethylene (hereinafter referred to as TFE) and structural units derived from a perfluorovinyl compound having a sulfonic acid group, and trivalent or tetravalent cerium ions or divalent or trivalent manganese ions (Patent Document 1).

The catalyst layer formed by using a coating liquid for forming a catalyst layer prepared by mixing such a liquid composition and a catalyst, has resistance to hydrogen peroxide or peroxide radicals. Recently, the membrane/electrode assembly is required to have a higher output voltage and to be capable of maintaining the higher output voltage for a long period of time, and even in the catalyst layer, further improvement is required.

PRIOR ART DOCUMENT

Patent Document

Patent Document 1: WO 2005/124912

DISCLOSURE OF INVENTION

Technical Problem

An object of the present invention is to provide a liquid composition capable of forming a catalyst layer which is excellent in resistance to hydrogen peroxide or peroxide radicals, which can further increase the output voltage of the membrane/electrode assembly, and which can maintain the high output voltage for a long period of time, a method for its production, and a method for producing a membrane/electrode assembly which is provided with a catalytic layer excellent in resistance to hydrogen peroxide or peroxide radicals, which has a higher output voltage and which can maintain the high output voltage over a long period of time.

Solution to Problem

The liquid composition of the present invention is a liquid composition to be used for forming a catalyst layer constituting an electrode of a membrane/electrode assembly for a polymer electrolyte fuel cell, characterized in that the liquid composition comprises a liquid medium, a fluoropolymer (H) having sulfonic acid groups and ring structures, and trivalent or tetravalent cerium ions, and the content of trivalent or tetravalent cerium ions is from 1.6 to 23.3 mol % to the sulfonic acid groups (100 mol %).

The fluoropolymer (H) preferably has a structural unit (A) having a sulfonic acid group and no ring structure, and a structural unit (B) having a ring structure and no sulfonic acid group.

At least one type of the structural unit (B) is preferably a structural unit represented by the following formula (B2-1).

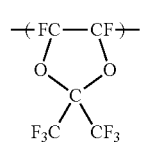

(B2-1)

At least one type of the structural unit (A) is preferably a structural unit represented by the following formula (A2-1).

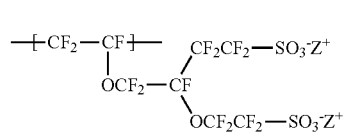

(A2-1)

wherein, $Z^+$ is $H^+$, a monovalent metal ion, or an ammonium ion wherein one or more hydrogen atoms may be substituted by a hydrocarbon group.

The method for producing the liquid composition of the present invention is characterized by mixing a liquid medium, a fluoropolymer (H) having sulfonic acid groups and ring structures, and a cerium compound.

In the method for producing the liquid composition of the present invention, it is preferred to use, as the fluoropolymer (H), one having a remaining sulfate ion concentration of at most 30 ppm.

In the method for producing the liquid composition of the present invention, it is preferred to preliminarily wash the fluoropolymer (H) with water of at least 50° C.

The method for producing a membrane/electrode assembly for a polymer electrolyte fuel cell of the present invention, is a method for producing a membrane/electrode assembly for a polymer electrolyte fuel cell which comprises an anode having a catalyst layer, a cathode having a catalyst layer, and a polymer electrolyte membrane disposed between the anode and the cathode, characterized by mixing the liquid composition of the present invention and a catalyst to prepare a coating liquid for forming a catalyst layer, and forming a catalyst layer for at least one of said cathode and said anode by using the coating liquid.

In the method for producing a membrane/electrode assembly for a polymer electrolyte fuel cell of the present invention, it is preferred to form the polymer electrolyte membrane by using a liquid composition comprising a liquid medium, a fluoropolymer having sulfonic acid groups, and trivalent or tetravalent cerium ions.

Advantageous Effects of Invention

According to the liquid composition of the present invention, it is possible to form a catalyst layer which is excellent in resistance to hydrogen peroxide or peroxide radicals, which can further increase the output voltage of the membrane/electrode assembly, and which can maintain the high output voltage for a long period of time.

According to the method for producing the liquid composition of the present invention, it is possible to produce a liquid composition capable of forming a catalyst layer which exhibits the above effects.

According to the method for producing a membrane/electrode assembly for a polymer electrolyte fuel cell of the present invention, it is possible to produce a membrane/electrode assembly which is provided with a catalyst layer excellent in resistance to hydrogen peroxide or peroxide radicals, which has a higher output voltage and which can maintain the high output voltage over a long period of time.

DESCRIPTION OF EMBODIMENTS

Figure 1:
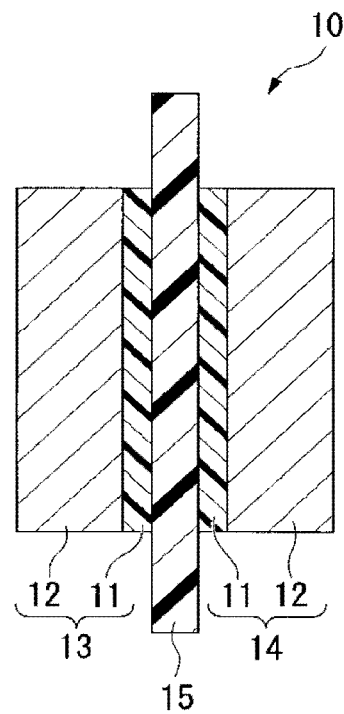
FIG. 1 is a schematic sectional view showing an example of the membrane/electrode assembly for a polymer electrolyte fuel cell.

In the present specification, a structural unit represented by the formula (A1) will be referred to as a structural unit (A1). Structural units represented by other formulae will be referred to in the same manner.

Further, a monomer represented by the formula (a1) will be referred to as a monomer (a1). Monomers represented by other formulae will be referred to in the same manner.

The following definitions of terms apply throughout the specification including claims.

A "polymer" means a compound having a structure composed of a plurality of structural units.

A "fluoropolymer" means a polymer wherein some or all of hydrogen atoms bonded to carbon atoms are substituted by fluorine atoms.

A "structural unit" means a unit derived from a monomer, formed by polymerization of the monomer. The structural unit may be a unit directly formed by the polymerization reaction of the monomer, or may be a unit having part of such a unit converted to another structure by treating the polymer.

A "monomer" means a compound having a polymerizable carbon-carbon double bond.

A "sulfonic acid group" includes $—SO_3^-H^+$ and $—SO_3^-M^+$ (where $M^+$ is a monovalent metal ion, or an ammonium ion wherein one or more hydrogen atoms may be substituted by a hydrocarbon group).

<Liquid Composition>

The liquid composition of the present invention is a liquid composition to be used for forming a catalyst layer constituting an electrode of a membrane/electrode assembly for a polymer electrolyte fuel cell.

The liquid composition of the present invention comprises a liquid medium, a fluoropolymer (H) having sulfonic acid groups and ring structures, and trivalent or tetravalent cerium ions.

(Liquid Medium)

The liquid medium is a compound which is liquid at room temperature (25° C.), which does not react with other components, and which is capable of dispersing or dissolving the fluoropolymer (H).

The liquid medium preferably contains an organic solvent having a hydroxy group.

The organic solvent having a hydroxy group may, for example, be methanol, ethanol, 1-propanol, 2-propanol, 1-butanol, 2-butanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol, 3,3,4,4,5,5,6,6,7,7,8,8,8-tridecafluoro-1-octanol, etc.

The number of carbon atoms in the organic solvent having a hydroxy group is preferably from 1 to 4, and methanol, ethanol, 1-propanol, 2-propanol, 1-butanol, 2-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, 3,3,3-trifluoro-1-propanol, etc. may be mentioned.

The number of carbon atoms in the organic solvent having a hydroxy group is more preferably 2 or 3, and ethanol, 1-propanol or 2-propanol is further preferred.

As the organic solvent having a hydroxy group, one type may be used alone, or two or more types may be used as mixed.

The liquid medium preferably further contains water.

The proportion of water is preferably from 10 to 99 mass %, more preferably from 40 to 99 mass %, in the liquid medium (100 mass %). By increasing the proportion of water, it is possible to improve the dispersibility of the fluoropolymer (H) in the liquid medium.

The proportion of the organic solvent having a hydroxy group is preferably from 1 to 90 mass %, more preferably from 1 to 60 mass %, in the liquid medium (100 mass %).

(Fluoropolymer (H))

The fluoropolymer (H) is a fluoropolymer having sulfonic acid groups and ring structures. As the fluoropolymer (H), from the viewpoint of excellent chemical durability, a perfluoropolymer wherein all of hydrogen atoms bonded to carbon atoms are substituted by fluorine atoms, is preferred.

The fluoropolymer (H) may be an acid type wherein cations of the sulfonic acid groups are H⁺, or a salt type wherein cations of the sulfonic acid groups are metal ions, ammonium ions, etc. In the case of the fluoropolymer (H) to be contained in the catalyst layer, usually an acid type fluoropolymer (H) is used. Some of cations of the sulfonic acid groups may be substituted by divalent or higher valent metal ions.

As the fluoropolymer (H), for example, the following fluoropolymer (H1), fluoropolymer (H2), fluoropolymer (H3), fluoropolymer (H4), fluoropolymer (H5), etc. may be mentioned. The fluoropolymer (H1) is preferred from such a viewpoint that the effect of the present invention can thereby be sufficiently obtained.

Fluoropolymer (H1): a copolymer having a structural unit (A) and a structural unit (B) as essential structural units, and having a structural unit (D) as the case requires.

Fluoropolymer (H2): a copolymer having a structural unit (C) as an essential structural unit, and having a structural unit (D) as the case requires.

Fluoropolymer (H3): a copolymer having a structural unit (A) and a structural unit (C) as essential structural units, and having a structural unit (D) as the case requires.

Fluoropolymer (H4): a copolymer having a structural unit (B) and a structural unit (C) as essential structural units, and having a structural unit (D) as the case requires.

Fluoropolymer (H5): a copolymer having a structural unit (A), a structural unit (B) and a structural unit (C) as essential structural units, and having a structural unit (D) as the case requires.

Structural unit (A): a structural unit having a sulfonic acid group and having no ring structure.

Structural unit (B): a structural unit having a ring structure and having no sulfonic acid group.

Structural unit (C): a structural unit having a sulfonic acid group and a ring structure.

Structural unit (D): a structural unit having no sulfonic acid group and no ring structure.

The ion exchange capacity of the fluoropolymer (H) is preferably from 0.5 to 2.8 meq/g dry resin, more preferably from 0.9 to 2.2 meq/g dry resin. When the ion exchange capacity is at least 0.5 meq/g dry resin, the proton conductivity becomes high, whereby it will be possible to obtain a sufficient cell output. When the ion exchange capacity is at most 2.8 meq/g dry resin, synthesis of a high molecular weight polymer becomes easy, and the fluoropolymer (H) will not be excessively swelled in water, whereby the mechanical strength can be maintained.

(Structural Unit (A))

The structural unit (A) is a structural unit having a sulfonic acid group and having no ring structure. As the structural unit (A), from the viewpoint of excellent chemical durability of the fluoropolymer (H), one wherein all of hydrogen atoms bonded to carbon atoms are substituted by fluorine atoms, is preferred.

The structural unit (A) may, for example, be the following structural unit (A1), structural unit (A2), structural unit (A3), etc. The structural unit (A2) is preferred from such a viewpoint that the effect of the present invention can thereby be sufficiently obtained.

Structural unit (A1): the structural unit (A1) is represented by the following formula.

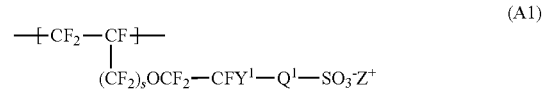

Here, $Q^1$ is a single bond, or a perfluoroalkylene group which may have an etheric oxygen atom, $Y^1$ is a fluorine atom or a monovalent perfluoro organic group, s is 0 or 1, and $Z^+$ is $H^+$, a monovalent metal ion, or an ammonium ion wherein one or more hydrogen atoms may be substituted by a hydrocarbon group. The single bond means that the carbon atom of $CFY^1$ and the sulfur atom of $SO_3$ are directly bonded. The organic group means a group containing one or more carbon atoms.

When the perfluoroalkylene group for $Q^1$ has an etheric oxygen atom, such oxygen atom may be only one or may be two or more. Further, such oxygen atom may be inserted between carbon-carbon atoms or may be inserted at a carbon atom bond terminal in the perfluoroalkylene group.

The perfluoroalkylene group may be linear or may be branched.

The number of carbon atoms in the perfluoroalkylene group is preferably from 1 to 6, more preferably from 1 to 4. When the number of carbon atoms is at most 6, decrease in the ion exchange capacity of the fluoropolymer (H) can be suppressed, and decrease in the proton conductivity can be suppressed.

As $Y^1$, a fluorine atom or a trifluoromethyl group is preferred.

As the structural unit (A1), structural units (A1-1) to (A1-4) are preferred from such a viewpoint that it is thereby easy to synthesize the monomer (a1) and industrial implementation is easy.

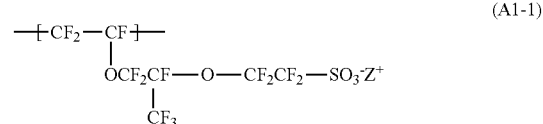

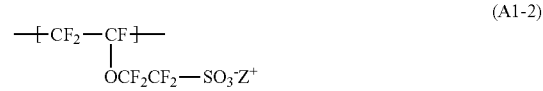

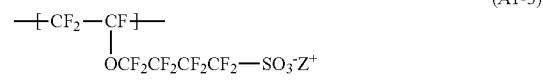

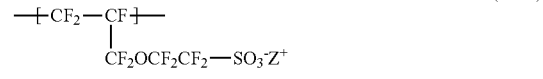

In a case where the fluoropolymer (H) has a structural unit (A1), the structural unit (A1) may be one type only or may be two or more types.

Structural unit (A2): the structural unit (A2) is represented by the following formula.

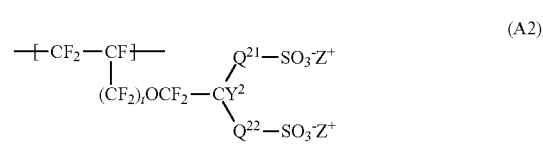

Here, $Q^{21}$ is a perfluoroalkylene group which may have an etheric oxygen atom, $Q^{22}$ is a single bond, or a perfluoroalkylene group which may have an etheric oxygen atom, $Y^2$ is a fluorine atom or a monovalent perfluoro organic group, t is 0 or 1, and $Z^+$ is $H^+$, a monovalent metal ion, or an ammonium ion wherein one or more hydrogen atoms may be substituted by a hydrocarbon group. The single bond means that the carbon atom of $CY^2$ and the sulfur atom of $SO_3$ are directly bonded. The organic group means a group containing one or more carbon atoms.

When the perfluoroalkylene group for $Q^{21}$ or $Q^{22}$ has an etheric oxygen atom, such oxygen atom may be only one or may be two or more. Further, such oxygen atom may be inserted between carbon-carbon atoms or may be inserted at a carbon atom bond terminal in the perfluoroalkylene group.

The perfluoroalkylene group may be linear or may be branched, and is preferably linear.

The number of carbon atoms in the perfluoroalkylene group is preferably from 1 to 6, more preferably from 1 to 4. When the number of carbon atoms is at most 6, the boiling point of a fluoromonomer as a raw material tends to be low, and distillation for purification tends to be easy. Further, when the number of carbon atoms is at most 6, increase in ion exchange capacity of the fluoropolymer (H) can be suppressed, and decrease in proton conductivity can be suppressed.

$Q^{22}$ is preferably a $C_{1-6}$ perfluoroalkylene group which may have an etheric oxygen atom. When $Q^{22}$ is a $C_{1-6}$ perfluoroalkylene group which may have an etheric oxygen atom, as compared with a case where $Q^{22}$ is a single bond, the stability in power generation performance will be excellent, when the polymer electrolyte fuel cell is operated for a long period of time.

At least one of $Q^{21}$ and $Q^{22}$ is preferably a $C_{1-6}$ perfluoroalkylene group having an etheric oxygen atom. A fluorinated monomer having a $C_{1-6}$ perfluoroalkylene group having an etheric oxygen atom, can be prepared without a fluorination reaction with a fluorine gas, whereby the yield will be good, and the production will be easy.

As $Y^2$, a fluorine atom or a $C_{1-6}$ linear perfluoroalkyl group which may have an etheric oxygen atom, is preferred.

As the structural unit (A2), structural units (A2-1) to (A2-3) are preferred from such a viewpoint that it is thereby easy to synthesize the monomer (a2), and industrial implementation is easy, and the structural unit (A2-1) is more preferred from such a viewpoint that the effect of the present invention will be thereby sufficiently obtainable.

In a case where the fluoropolymer (H) has a structural unit (A2), the structural unit (A2) may be one type only or may be two or more types.

Structural unit (A3): the structural unit (A3) is represented by the following formula.

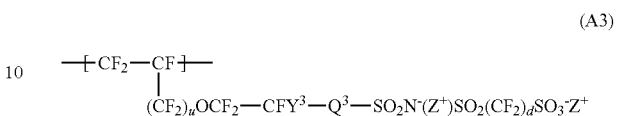

(A3)

Here, $Q^3$ is a single bond, or a perfluoroalkylene group which may have an etheric oxygen atom, $Y^3$ is a fluorine atom or a monovalent perfluoro organic group, u is 0 or 1, d is an integer of from 1 to 4, and $Z^+$ is $H^+$, a monovalent metal ion, or an ammonium ion wherein one or more hydrogen atoms may be substituted by a hydrocarbon group.

The single bond means that the carbon atom of $CFY^3$ and the sulfur atom of $SO_3$ are directly bonded. The organic group means a group containing one or more carbon atoms.

When the perfluoroalkylene group for $Q^3$ has an etheric oxygen atom, such oxygen atom may be only one or may be two or more. Further, such oxygen atom may be inserted between carbon-carbon atoms or may be inserted at a carbon atom bond terminal, in the perfluoroalkylene group.

The perfluoroalkylene group may be linear or may be branched.

The number of carbon atoms in the perfluoroalkylene group is preferably from 1 to 10, more preferably from 1 to 6, further preferably from 1 to 4. When the number of carbon atoms is at most 10, increase in ion exchange capacity of the fluoropolymer (H) can be suppressed, and decrease in proton conductivity can be suppressed.

As $Y^3$, a fluorine atom or a trifluoromethyl group is preferred.

d is particularly preferably 2, from such a viewpoint that synthesis of the monomer (a3) is thereby easy, and a fluoropolymer (H) having a high ion exchange capacity can be obtained.

As the structural unit (A3), structural units (A3-1) to (A3-4) are preferred from such a viewpoint that synthesis of the monomer (a3) is thereby easy, and industrial implementation is easy.

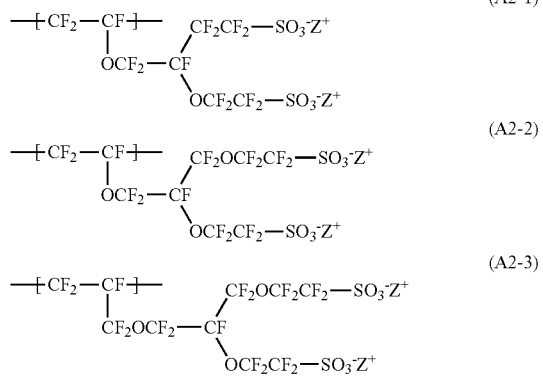

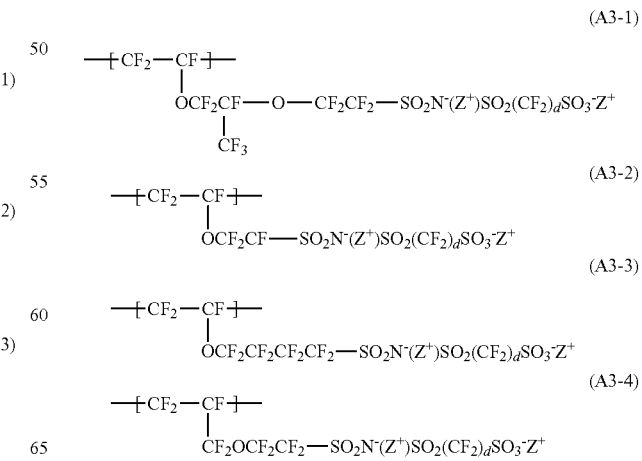

In a case where the fluoropolymer (H) has a structural unit (A3), the structural unit (A3) may be one type only or may be two or more types.

(Structural Unit (B))

The structural unit (B) is a structural unit having no sulfonic acid group and having a ring structure. As the structural unit (B), one wherein all of hydrogen atoms bonded to carbon atoms are substituted by fluorine atoms, is preferred from such a viewpoint that the fluoropolymer (H) will thereby be excellent in chemical durability.

As the ring structure, a fluorinated aliphatic ring is preferred. Some of the carbon atoms constituting the fluorinated aliphatic ring may be substituted by oxygen atoms.

The fluorinated aliphatic ring is preferably a 4- to 7-membered ring, and a 5-membered ring is more preferred, from such a viewpoint that the effect of the present invention can thereby be sufficiently obtained.

As the structural unit (B) having a 5-membered fluorinated aliphatic ring, the following structural unit (B1), structural unit (B2), structural unit (B3), structural unit (B4), etc. may be mentioned, and the structural unit (B2) is preferred from such a viewpoint that the effect of the present invention can thereby be sufficiently obtained.

Structural unit (B1): the structural unit (B1) is represented by the following formula.

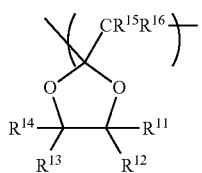
(B1)

Here, $R^{11}$ to $R^{16}$ are each independently a monovalent perfluoro organic group which may have an etheric oxygen atom, or a fluorine atom. The organic group means a group containing one or more carbon atoms.

As the monovalent perfluoro organic group, a perfluoroalkyl group is preferred. Of $R^{15}$ and $R^{16}$, at least one is a fluorine atom, and more preferably both are fluorine atoms, from the viewpoint of high polymerizability.

When the perfluoroalkyl group has an etheric oxygen atom, such oxygen atom may be only one or may be two or more. Further, such oxygen atom may be inserted between carbon-carbon atoms or may be inserted at a carbon atom bond terminal, in the perfluoroalkyl group.

The perfluoroalkyl group may be linear or may be branched, but is preferably linear.

As the structural unit (B1), structural units (B1-1) and (B1-2) may be mentioned, and the structural unit (B1-1) is preferred from such a viewpoint that synthesis of the monomer (b1) is thereby easy, and the polymerization reactivity is high.

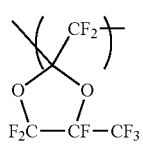
(B1-1)

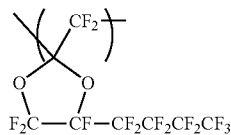
(B1-2)

In a case where the fluoropolymer (H) has a structural unit (B1), the structural unit (B1) may be one type only or may be two or more types.

Structural unit (B2): the structural unit (B2) is represented by the following formula.

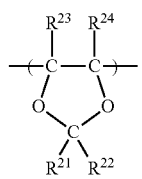
(B2)

Here, $R^{21}$ to $R^{22}$ are each independently a fluorine atom or a $C_{1-5}$ perfluoroalkyl group, and $R^{23}$ to $R^{24}$ are each independently a fluorine atom, a $C_{1-5}$ perfluoroalkyl group, or a $C_{1-5}$ perfluoroalkoxy group.

The perfluoroalkyl group and the perfluoroalkoxy group may be linear or may be branched, but are preferably linear.

As the structural unit (B2), structural units (B2-1) to (B2-8) may be mentioned, and the structural unit (B2-1) is preferred from such a viewpoint that synthesis of the monomer (b2) is thereby easy, the polymerization reactivity is high, and the effects of the present invention can be sufficiently obtained.

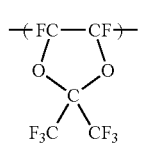
(B2-1)

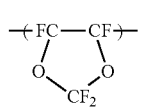
(B2-2)

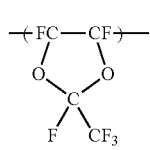
(B2-3)

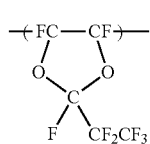
(B2-4)

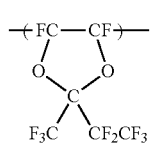
(B2-5)

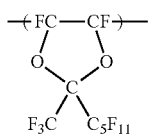
(B2-6)

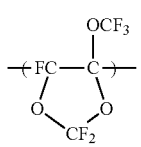
(B2-7)

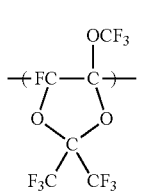
(B2-8)

In a case where the fluoropolymer (H) has a structural unit (B2), the structural unit (B2) may be one type only or may be two or more types.

Structural unit (B3): the structural unit (B3) is represented by the following formula.

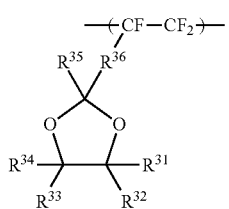
(B3)

Here, $R^{31}$ to $R^{35}$ are each independently a fluorine atom, a $C_{1-6}$ perfluoroalkyl group, or a $C_{2-6}$ perfluoroalkyl group having an etheric oxygen atom between carbon-carbon atoms. $R^{36}$ is a single bond, a $C_{1-6}$ perfluoroalkylene group, or a $C_2$-6 perfluoroalkylene group having an etheric oxygen atom between carbon-carbon atoms.

When the perfluoroalkyl group for $R^{31}$ to $R^{35}$ has an etheric oxygen atom, such oxygen atom may be only one or may be two or more. The perfluoroalkyl group may be linear or may be branched, but is preferably linear.

When the perfluoroalkylene group for $R^{36}$ has an etheric oxygen atom, such oxygen atom may be only one or may be two or more. The perfluoroalkylene group may be linear or may be branched, but is preferably linear.

As the structural unit (B3), structural units (B3-1) and (B3-2) may be mentioned.

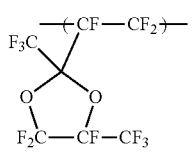
(B3-1)

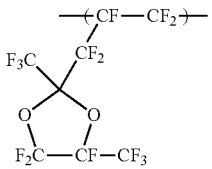
(B3-2)

In a case where the fluoropolymer (H) has a structural unit (B3), the structural unit (B3) may be one type only or may be two or more types.

Structural unit (B4): the structural unit (B4) is represented by the following formula.

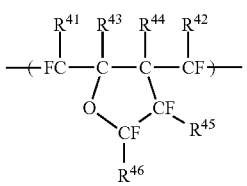
(B4)

Here, $R^{41}$ to $R^{46}$ are each independently a monovalent perfluoro organic group which may have an etheric oxygen atom, or a fluorine atom. As the monovalent perfluoro organic group, a perfluoroalkyl group is preferred.

When the perfluoroalkyl group has an etheric oxygen atom, such oxygen atom may be only one or may be two or more. Further, such oxygen atom may be inserted between carbon-carbon atoms or may be inserted at a carbon atom bond terminal in the perfluoroalkyl group.

The perfluoroalkyl group may be linear or may be branched, but is preferably linear.

Each of $R^{41}$ to $R^{44}$ is more preferably a fluorine atom, since the polymerization reactivity is thereby high.

As the structural units (B4), structural units (B4-1) to (B4-3) may be mentioned, and the structural unit (B4-1) is preferred from such a viewpoint that synthesis of the monomer (b4) is thereby easy.

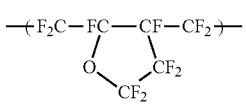
(B4-1)

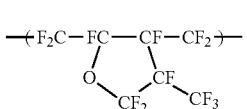
(B4-2)

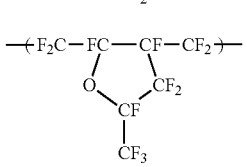
(B4-3)

When the fluoropolymer (H) has a structural unit (B4), the structural unit (B4) may be one type only, or may be two or more types.

Structural units (B5):

A structural unit (B) other than the structural units (B1) to (B4) may be a structural unit (B5) derived from a perfluoromonomer (monomer (b5)) having at least two carbon-carbon double bonds with a polymerization reactivity as described below and having a 5-membered ring. By incorporating the structural unit (B5), it is possible to increase the molecular weight of the fluoropolymer (H).

(Structural Unit (C))

The structural unit (C) is a structural unit having a sulfonic acid group and a ring structure. As the structural unit (C), one wherein all of hydrogen atoms bonded to carbon atoms are substituted by fluorine atoms, is preferred from the viewpoint of excellent chemical durability of the fluoropolymer (H).

As the ring structure, a fluorinated aliphatic ring is preferred. Some of carbon atoms constituting the fluorinated aliphatic ring may be substituted by oxygen atoms. The fluorinated aliphatic ring is preferably a 4- to 7-membered ring, and from such a viewpoint that the effect of the present invention can be sufficiently obtained, a 5-membered ring is more preferred.

As the structural unit (C) having a 5-membered fluorinated aliphatic ring, the following structural unit (C1), structural unit (C2), structural unit (C3), etc., may be mentioned, and from such a viewpoint that the effect of the present invention can be sufficiently obtained, the structural unit (C2) is preferred.

Structural unit (C1): the structural unit (C1) is represented by the following formula.

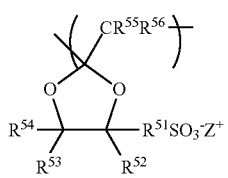

(C1)

Here, $R^{51}$ is a divalent perfluoro organic group which may have an etheric oxygen atom, $R^{52}$, $R^{53}$, $R^{55}$ and $R^{56}$ are each independently a monovalent perfluoro organic group which may have an etheric oxygen atom, or a fluorine atom, $R^{54}$ is a monovalent perfluoro organic group which may have an etheric oxygen atom, a fluorine atom, or a $-R^{51}SO_3-Z^+$ group, and $Z^+$ is $H^+$, a monovalent metal ion, or an ammonium ion wherein one or more hydrogen atoms may be substituted by a hydrocarbon group. The organic group means a group containing one or more carbon atoms.

As the divalent perfluoro organic group for $R^{51}$, a perfluoroalkylene group is preferred. When the perfluoroalkylene group has an etheric oxygen atom, such oxygen atom may be only one, or may be two or more. Further, such oxygen atom may be inserted between carbon-carbon atoms or may be inserted at a carbon atom bond terminal, in the perfluoroalkylene group. The perfluoroalkylene group may be linear or may be branched, but is preferably linear.

As the monovalent perfluoro organic group for $R^{52}$, $R^{53}$, $R^{55}$ and $R^{56}$, a perfluoroalkyl group is preferred. Of $R^{55}$ and $R^{56}$, at least one is preferably a fluorine atom, and more preferably, both are fluorine atoms, from the viewpoint of high polymerization reactivity.

As the monovalent perfluoro organic group for $R^{54}$, a perfluoroalkyl group is preferred. When the perfluoroalkyl group has an etheric oxygen atom, such oxygen atom may be only one or may be two or more. Further, such oxygen atom may be inserted between carbon-carbon atoms or may be inserted at a carbon atom bond terminal, in the perfluoroalkyl group. The perfluoroalkyl group may be linear or may be branched, but is preferably linear. When the structural unit (C1) has two $R^{51}$, the two $R^{51}$ may be the same groups or different groups.

As the structural unit (C1), structural units (C1-1) to (C1-4) may be mentioned, and from such a viewpoint that synthesis of the monomer (c1) is thereby easy and industrial implementation is easy, the structural unit (C1-1) is preferred.

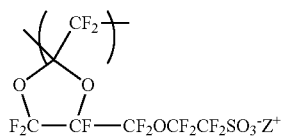

(C1-1)

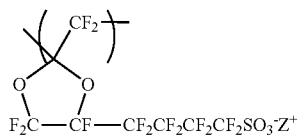

(C1-2)

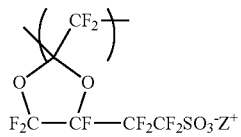

(C1-3)

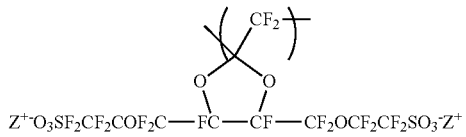

(C1-4)

When the fluoropolymer (H) has a structural unit (C1), the structural unit (C1) may be one type only, or may be two or more types.

Structural unit (C2): the structural unit (C2) is represented by the following formula.

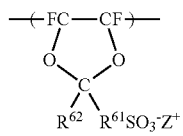

(C2)

Here, $R^{61}$ is a $C_{1-6}$ perfluoroalkylene group or a $C_{2-6}$ perfluoroalkylene group having an etheric oxygen atom between carbon-carbon atoms, $R^{62}$ is a fluorine atom, a $C_{1-6}$ perfluoroalkyl group, a $C_{2-6}$ perfluoroalkyl group having an etheric oxygen atom between carbon-carbon atoms, or a $-R^{61}SO_3-Z^+$ group, and $Z^+$ is $H^+$, a monovalent metal ion, or an ammonium ion wherein one or more hydrogen atoms are substituted by a hydrocarbon group. The organic group means a group containing one or more carbon atoms.

When the perfluoroalkylene group for $R^{61}$ has an etheric oxygen atom, such oxygen atom may be only one or may be two or more. The perfluoroalkylene group may be linear or may be branched, but is preferably linear.

When the perfluoroalkyl group for $R^{62}$ has an etheric oxygen atom, such oxygen atom may be only one or may be two or more. The perfluoroalkyl group may be linear or may be branched, but is preferably linear. When the structural unit (C2) has two $R^{61}$ such two $R^{61}$ may be the same groups or different groups.

As the structural unit (C2), structural units (C2-1) and (C2-2) may be mentioned.

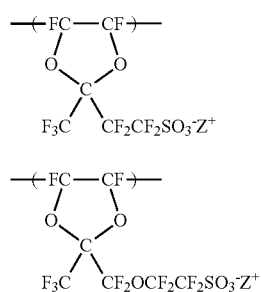

(C2-1)

(C2-2)

When the fluoropolymer (H) has a structural unit (C2), the structural unit (C2) may be one type only, or may be two or more types.

Structural unit (C3): the structural unit (C3) is represented by the following formula.

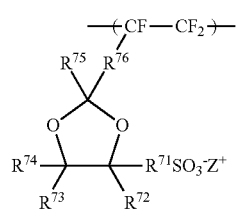

(C3)

Here, $R^{71}$ is a $C_{1-6}$ perfluoroalkylene group or a $C_{2-6}$ perfluoroalkylene group having an etheric oxygen atom between carbon-carbon atoms, $R^{72}$ to $R^{75}$ are each independently a fluorine atom, a $C_{1-6}$ perfluoroalkyl group or a $C_{2-6}$ perfluoroalkyl group having an etheric oxygen atom between carbon-carbon atoms, $R^{76}$ is a single bond, a $C_{1-6}$ perfluoroalkylene group or a $C_{2-6}$ perfluoroalkylene group having an etheric oxygen atom between carbon-carbon atoms, and $Z^+$ is $H^+$, a monovalent metal ion, or an ammonium ion wherein one or more hydrogen atoms may be substituted by a hydrocarbon group. The organic group means a group containing one or more carbon atoms.

When the perfluoroalkylene group for $R^{71}$ has an etheric oxygen atom, such oxygen atom may be only one, or may be two or more. The perfluoroalkylene group may be linear or may be branched, but is preferably linear.

When the perfluoroalkyl group for $R^{72}$ to $R^{75}$ has an etheric oxygen atom, such oxygen atom may be only one, or may be two or more. The perfluoroalkyl group may be linear or may be branched, but is preferably linear.

When the perfluoroalkylene group for $R^{76}$ has an etheric oxygen atom, such oxygen atom may be only one, or may be two or more. The perfluoroalkylene group may be linear or may be branched, but is preferably linear.

As the structural unit (C3), structural units (C3-1) and (C3-2) may be mentioned.

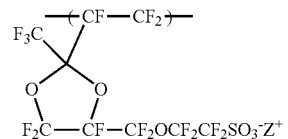

(C3-1)

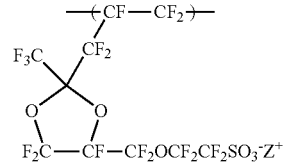

(C3-2)

When the fluoropolymer (H) has a structural unit (C3), the structural unit (C3) may be one type only, or may be two or more types.

(Structural Unit (D))

The structural unit (D) is a structural unit having no sulfonic acid group and no ring structure. As the structural unit (D), one wherein all of hydrogen atoms bonded to carbon atoms are substituted by fluorine atoms, is preferred, from the viewpoint of excellent chemical durability of the fluoropolymer (H).

As the structural unit (D), a structural unit derived from a monomer (d) other than monomers (a) to (c) which will be described later, may be mentioned, and from the viewpoint of mechanical strength and chemical durability, a structural unit derived from TFE is preferred.

(Process for Producing Fluoropolymer (H))

The process for producing a fluoropolymer (H) may, for example, be a process comprising the following steps (I) to (III).

(I) A step of obtaining a precursor polymer (hereinafter referred to as polymer (F)) having $-SO_2F$ (a precursor group for a sulfonic acid group).

(II) A step of subjecting polymer (F) to hydrolysis treatment to convert $-SO_2F$ to $-SO_3^-M^+$ (where $M^+$ is a monovalent metal ion, or an ammonium ion wherein one or more hydrogen atoms may be substituted by a hydrocarbon group), thereby to obtain a salt form fluoropolymer (H).

(III) As the case requires, a step of subjecting the salt form fluoropolymer (H) to acid form treatment to convert $-SO_3^-M^+$ to $-SO_3^-H^+$, thereby to obtain an acid form fluoropolymer (H).

(Step (I))

The method for producing the polymer (F) may be suitably selected from known methods, depending on the structural units which the desired fluoropolymer (H) has.

In a case where the fluoropolymer (H) has a structural unit (A1):

Polymer (F) as a precursor polymer for the fluoropolymer (H) having a structural unit (A1), may be obtained by polymerizing a monomer (a1) and another monomer.

$$CF_2=CF(CF_2)_sOCF_2-CFY^1-Q^1-SO_2F \qquad (a1)$$

As the monomer (a1), monomers (a1-1) to (a1-4) are preferred.

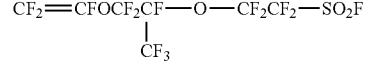

(a1-1)

$$CF_2=CFOCF_2CF_2-SO_2F \quad (a1\text{-}2)$$

$$CF_2=CFOCF_2CF_2CF_2CF_2-SO_2F \quad (a1\text{-}3)$$

$$CF_2=CFCF_2OCF_2CF_2-SO_2F \quad (a1\text{-}4)$$

The monomer (a1) can be prepared by a known synthetic method, such as the method disclosed by D. J. Vaugham al., "Du Pont Inovation", Vol. 43, No. 3, 1973, p. 10, or the method disclosed in Example in U.S. Pat. No. 4,358,412.

As the polymerization method, a known polymerization method such as a bulk polymerization method, a solution polymerization method, a suspension polymerization method or an emulsion polymerization method may be mentioned. Further, the polymerization may be carried out in a liquid or supercritical carbon dioxide.

The polymerization is carried out under such conditions that radicals will be formed. The method for forming radicals may, for example, be a method of applying radiation such as ultraviolet rays, γ-rays or electron beams, or a method of adding a radical initiator.

In a case where the fluoropolymer (H) has a structural unit (A2):

Polymer (F) as a precursor polymer for the fluoropolymer (H) having a structural unit (A2), may be obtained by polymerizing a monomer (a2) and another monomer.

$$CF_2=CF(CF_2)_tOCF_2-C\begin{smallmatrix}Q^{21}-SO_2F\\Y^2\\Q^{22}-SO_2F\end{smallmatrix} \quad (a2)$$

As the monomer (a2), monomer (a2-1) to (a2-3) are preferred.

$$CF_2=CFOCF_2-CF\begin{smallmatrix}CF_2CF_2-SO_2F\\\\OCF_2CF_2-SO_2F\end{smallmatrix} \quad (a2\text{-}1)$$

$$CF_2=CFOCF_2-CF\begin{smallmatrix}CF_2OCF_2CF_2-SO_2F\\\\OCF_2CF_2-SO_2F\end{smallmatrix} \quad (a2\text{-}2)$$

$$CF_2=CFCF_2OCF_2-CF\begin{smallmatrix}CF_2OCF_2CF_2-SO_2F\\\\OCF_2CF_2-SO_2F\end{smallmatrix} \quad (a2\text{-}3)$$

The monomer (a2) can be prepared by a known synthetic method, such as the method disclosed in WO 2007/013533.

As the polymerization method, the same method as the above-mentioned polymerization method may be mentioned.

In a case where the fluoropolymer (H) has a structural unit (A3):

Polymer (F) as a precursor polymer for the fluoropolymer (H) having a structural unit (A3) may be produced, for example, through the following step (i) and step (ii).

(i) A step of converting —$SO_2F$ in a polymer (F) having a unit derived from the monomer (a1) to —$SO_2NH_2$, to obtain a polymer (G).

(ii) A step of reacting the polymer (G) with $FSO_2(CF_2)_dSO_2F$ to convert —$SO_2NH_2$ to —$SO_2N^-(H^+)SO_2(CF_2)_dSO_2F$, to obtain the desired polymer (F).

Step (i):

As the method for converting —$SO_2F$ to —$SO_2NH_2$, a method of contacting the polymer (F) with ammonia.

As the method for contacting the polymer (F) with ammonia, for example, a method of contacting the polymer (F) directly with ammonia, a method of bubbling by blowing ammonia into a polymer solution prepared by dissolving the polymer (F), or a method of contacting the polymer (F) with ammonia in a state of being swollen in a solvent may be mentioned.

Step (ii):

$FSO_2(CF_2)_dSO_2F$ can be synthesized by a known method. As the method of synthesis, when d is 2, for example, the following methods may be mentioned.

(α) A method wherein $ICF_2CF_2I$ being an adduct of TFE and iodine, is used as the starting material, and by a known method, it is converted to $NaSO_2CF_2CF_2SO_2Na$, then converted to $ClSO_2CF_2CF_2SO_2Cl$, and finally converted to $FSO_2CF_2CF_2SO_2F$.

(β) A method wherein TFE is reacted with sulfuric anhydride to obtain a tetrafluoroethane sultone, which is then ring-opened, followed by hydrolysis to obtain $FSO_2CF_2COOH$, which is further subjected to coupling by Kolbe electrolysis to obtain the desired product (JP-A-2010-095470).

In step (ii), it is preferred that the polymer (F) is swollen or dissolved in an aprotic polar solvent and reacted with $FSO_2(CF_2)_dSO_2$.

The aprotic polar solvent may, for example, be N,N-dimethylacetamide, N,N-dimethylformamide, 1,3-dimethyl-2-imidazolidinone, N-methyl-2-pyrrolidone, dimethyl sulfoxide, sulfolane, γ-butyrolactone, acetonitrile, tetrahydrofuran, 1,4-dioxane, etc.

It is also preferred to use a reaction accelerator at the time of reacting the polymer (F) with $FSO_2(CF_2)_dSO_2F$. As such a reaction accelerator, a tertiary organic amine is preferred.

In step (ii), it is preferred not to let moisture be included in order to prevent hydrolysis of $FSO_2(CF_2)_dSO_2F$.

In a case where the fluoropolymer (H) has a structural unit (B1):

Polymer (F) as a precursor polymer for the fluoropolymer (H) having a structural unit (B1), may be obtained by polymerizing the monomer (b1) and another monomer.

$$\begin{smallmatrix}R^{15}\\\\\phantom{x}\end{smallmatrix}C\begin{smallmatrix}R^{16}\\\\\phantom{x}\end{smallmatrix}\text{ on ring with }R^{11},R^{12},R^{13},R^{14} \quad (b1)$$

As the monomer (b1), monomers (b1-1) and (b1-2) may be mentioned.

$$CF_2\text{ on ring with }F_2C-CF-CF_3 \quad (b1\text{-}1)$$

(b1-2)

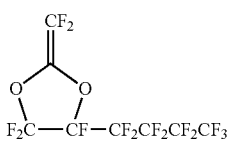

The monomer (b1) can be synthesized by the method disclosed in e.g. WO 2000/056694; Izvestiya Akademii Nauk SSSR, Seriya Khimicheskaya, 1989, Vol. 4, p. 938-42; etc. As the polymerization method, the same method as the above-mentioned polymerization method may be mentioned.

In a case where the fluoropolymer (H) has a structural unit (B2):

Polymer (F) as a precursor polymer for the fluoropolymer (H) having a structural unit (B2), may be obtained by polymerizing the monomer (b2) and another monomer.

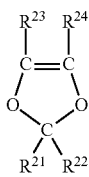

(b2)

As the monomer (b2), monomers (b2-1) to (b2-8) may be mentioned.

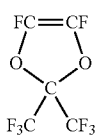

(b2-1)

(b2-2)

(b2-3)

(b2-4)

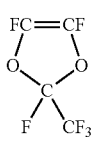

(b2-5)

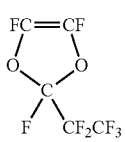

(b2-6)

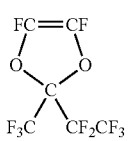

(b2-7)

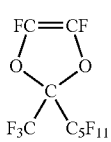

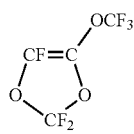

(b2-8)

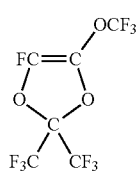

The monomer (b2) can be synthesized by the method disclosed in e.g. Macromolecule, No. 26, Vol. 22, 1993, p. 5829-5834; JP-A-6-92957; etc. As the polymerization method, the same method as the above-mentioned polymerization method may be mentioned.

In a case where the fluoropolymer (H) has a structural unit (B3):

Polymer (F) as a precursor polymer for the fluoropolymer (H) having a structural unit (B3), may be obtained by polymerizing a monomer (b3) and another monomer.

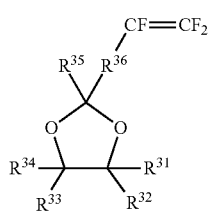

(b3)

As the monomer (b3), monomers (b3-1) and (b3-2) may be mentioned.

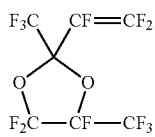

(b3-1)

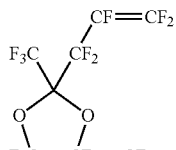

(b3-2)

The monomer (b3) may be synthesized by the method disclosed in e.g. JP-A-2006-241302, etc. As the polymerization method, the same method as the above-mentioned polymerization method may be mentioned.

In a case where the fluoropolymer (H) has a structural unit (B4):

Polymer (F) as a precursor polymer for the fluoropolymer (H) having a structural unit (B4), may be obtained by polymerizing the monomer (b4) and another monomer.

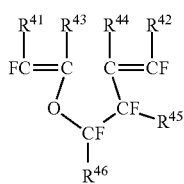
(b4)

As the monomer (b4), monomers (b4-1) to (b4-3) may be mentioned.

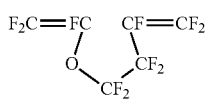
(b4-1)

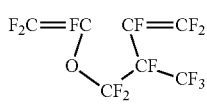
(b4-2)

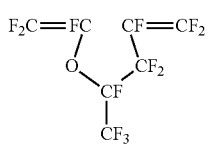
(b4-3)

The compound (b4) may be synthesized by the method disclosed in e.g. Macromol. Symp., Vol. 98, 1995, p. 753-767, etc. As the polymerization method, the same method as the above-mentioned polymerization method may be mentioned.

In a case where the fluoropolymer (H) has a structural unit (B5):

Polymer (F) as a precursor polymer for the fluoropolymer (H) having a structural unit (B5), may be obtained by polymerizing a monomer (b5) and another monomer.

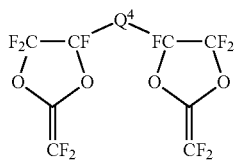
(b5)

$Q^4$ is a single bond, an oxygen atom or a $C_{1-10}$ perfluoroalkylene group which may have an etheric oxygen atom. As the monomer (b5), monomers (b5-1) to (b5-6) may be mentioned.

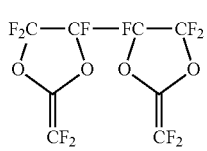
(b5-1)

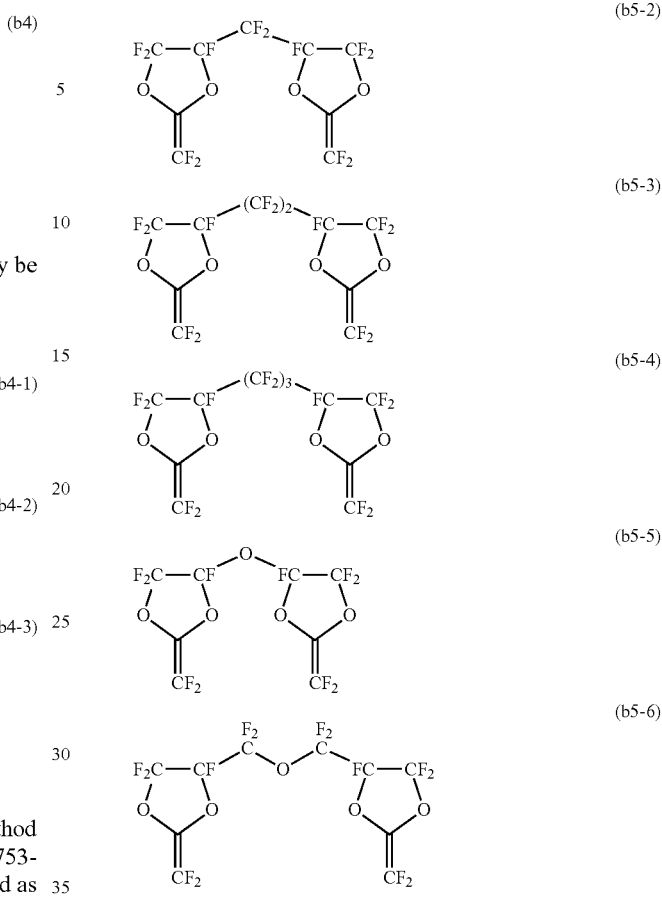

As the polymerization method, the same method as the above-mentioned polymerization method may be mentioned.

In a case where the fluoropolymer (H) has a structural unit (C1):

Polymer (F) as a precursor polymer for the fluoropolymer (H) having a structural unit (C1), may be obtained by polymerizing the monomer (c1) and another monomer.

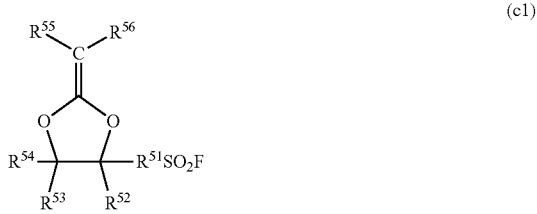
(c1)

As the monomer (c1), monomers (c1-1) to (c4-4) may be mentioned.

(c1-1)

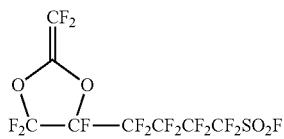

(c1-2)

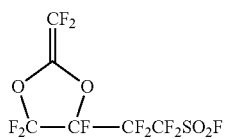

(c1-3)

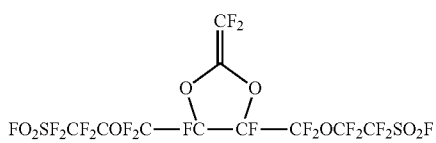

(c1-4)

The monomer (c1) may be synthesized by the method disclosed in e.g. WO 2003/037885, JP-A-2005-314388, JP-A-2009-040909, etc. As the polymerization method, the same method as the above-mentioned polymerization method may be mentioned.

In a case where the fluoropolymer (H) has a structural unit (C2):

Polymer (F) as a precursor polymer for the fluoropolymer (H) having a structural unit (C2), may be obtained by polymerizing the monomer (c2) and another monomer.

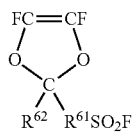

(c2)

As the monomer (c2), monomers (c2-1) and (c2-2) may be mentioned.

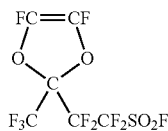

(c2-1)

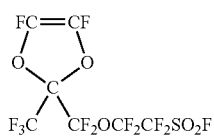

(c2-2)

The monomer (c2) may be synthesized by the method disclosed in e.g. JP-A-2006-152249, etc. As the polymerization method, the same method as the above-mentioned polymerization method may be mentioned.

In a case where the fluoropolymer (H) has a structural unit (C3):

Polymer (F) as a precursor polymer for the fluoropolymer (H) having a structural unit (C3), may be obtained by polymerizing monomers (c3) and another monomer.

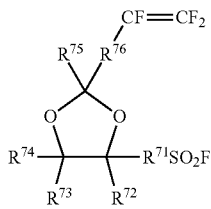

(c3)

As the monomer (c3), monomers (c3-1) and (c3-2) may be mentioned.

(c3-1)

(c3-2)

The monomers (c3) may be synthesized by the method disclosed in e.g. JP-A-2006-241302, etc. As the polymerization method, the same method as the above-mentioned polymerization method may be mentioned.

In a case where the fluoropolymer (H) has a structural unit (D):

Polymer (F) as a precursor polymer for the fluoropolymer (H) having a structural unit (C3), may be obtained by polymerizing a monomer (d) other than the monomers (a) to (c), and another monomer.

The monomer (d) may, for example, be TFE, chlorotrifluoroethylene, trifluoroethylene, vinylidene fluoride, vinyl fluoride, ethylene, propylene, a perfluoro α-olefin (such as hexafluoropropylene), a (perfluoroalkyl) ethylene (such as (perfluorobutyl) ethylene), a (perfluoroalkyl) propene (such as 3-perfluorooctyl-1-propene), a perfluorovinyl ether (such as a perfluoro(alkyl vinyl ether) or a perfluoro(etheric oxygen atom-containing alkyl vinyl ether)), etc.

Fluorination treatment of polymer (F):

If necessary, an unstable terminal group of the polymer (F) may be fluorinated by contacting the polymer (F) and fluorine gas.

The unstable terminal group may, for example, be a group formed by a chain transfer reaction, a group based on a radical initiator, or the like. Specifically, it includes —C(O)OH, —CF=CF$_2$, —C(O)F, —CF$_2$H, etc. By fluorinating or stabilizing such an unstable terminal group, decomposition of the finally obtained polymer (H) will be suppressed, and durability will be improved.

Fluorine gas may be used as diluted with an inert gas such as nitrogen, helium or carbon dioxide, or may be used as it is without dilution.

The temperature at the time of contacting the polymer (F) and fluorine gas is preferably from room temperature to 300° C., more preferably from 50 to 250° C., further preferably from 100 to 220° C., particularly preferably from 150 to 200° C. The contacting time of the polymer (F) with fluorine gas is preferably from 1 minute to 1 week, more preferably from 1 to 50 hours.

(Step (II))

—$SO_2F$ of the polymer (F) is hydrolyzed to —$SO_3^-M^+$, to obtain a salt form fluoropolymer (H). Here, in the case of the polymer (F) having —$SO_2N^-(H^+)SO_2(CF_2)_aSO_2F$, —$SO_2N^-(H^+)SO_2(CF_2)_aSO_2F$ is converted to —$SO_2N^-(M^+)SO_2(CF_2)_2SO_3^-M^+$.

The hydrolysis treatment is carried out, for example, by contacting the polymer (F) and a basic compound in a solvent. Specifically, it is preferred to carry out the hydrolysis treatment by dispersing the polymer (F) in a solution of a basic compound, e.g. by stirring.

The basic compound may, for example, be sodium hydroxide or potassium hydroxide.

The solvent may, for example, be water or a mixed solvent of water and a polar solvent. The polar solvent may, for example, be an alcohol (such as methanol or ethanol) or dimethyl sulfoxide.

The concentration of the basic compound is preferably from 25 to 40 mass % in the solution of a basic compound. The temperature for the hydrolysis treatment is preferably from 80 to 95° C. The time for the hydrolysis treatment is preferably from 10 to 20 hours.

(Step (III))

—$SO_3^-M^+$ of the salt form fluoropolymer (H) is subjected to acid form treatment to —$SO_3^-H^+$, to obtain the acid form fluoropolymer (H). Here, in the case of the salt form fluoropolymer (H) having —$SO_2N^-(M^+)SO_2(CF_2)_aSO_3^-M^+$, —$SO_2N^-(M^+)SO_2(CF_2)_aSO_3^-M^+$ is converted to —$SO_2N^-(H^+)SO_2(CF_2)_2SO_3^-H^+$.

The acid form treatment is carried out, for example, by contacting the salt form fluoropolymer (H) with an aqueous solution of an acid (such as sulfuric acid, hydrochloric acid or nitric acid). Specifically, it is preferred to carry out the acid form treatment by dispersing the salt form fluoropolymer (H) in an aqueous solution of an acid e.g. by stirring.

The concentration of the acid in the aqueous acid solution is preferably from 2 to 3N. The temperature for the acid form treatment is preferably from 80 to 90° C. The time for the acid form treatment is preferably from 4 to 7 hours.

(Cerium Ions)

As the liquid composition of the present invention contains cerium ions, some of cations in the fluoropolymer (H) are ion-exchanged with cerium ions, whereby in the catalyst layer, deterioration of the fluoropolymer (H) due to hydrogen peroxide or peroxide radicals can be efficiently prevented. Further, the present inventors have newly found that in the catalyst layer, cerium ions will inhibit poisoning of the catalyst by decomposed products (such as sulfate ions) of the fluoropolymer (H), whereby it is possible to further increase the output voltage of the membrane electrode assembly and to maintain the high output voltage over a long period of time.

Cerium ions may be of a +3 valence or may be of a +4 valence.

The cerium salt to obtain the liquid composition of the present invention containing cerium ions may, for example, be cerium carbonate, cerium acetate, cerium chloride, cerium nitrate, cerium sulfate, diammonium cerium nitrate or quaternary ammonium cerium sulfate, and cerium carbonate is preferred from such a viewpoint that carbonic acid can easily be removed as a gas from the liquid composition of the present invention. The cerium salt may be an organic metal complex, and as an example, cerium acetylacetonate may be mentioned.

Even when the cerium element is contained in the form of a hardly soluble cerium compound in the liquid composition of the present invention or in the catalyst layer, it is possible to prevent the deterioration of the fluoropolymer (H) by hydrogen peroxide or peroxide radicals. That is, the hardly soluble cerium compound will be partially dissociated or dissolved in the liquid composition of the present invention or in the catalyst layer, to form cerium ions. Further, the hardly soluble cerium compound itself acts as a catalyst for decomposition of hydrogen peroxide or peroxide radicals.

The hardly soluble cerium compound may, for example, be cerium phosphate, cerium oxide, cerium hydroxide, cerium fluoride, cerium oxalate, cerium tungstate or a cerium salt of a heteropoly acid. From the viewpoint of a high effect to prevent deterioration of the fluoropolymer (H) by hydrogen peroxide or peroxide radicals, at least one member selected from cerium phosphate, cerium oxide, cerium fluoride, cerium tungstate and a cerium salt of a heteropoly acid is preferred. Cerium oxide is particularly preferred, since it is excellent in dispersibility when added to the liquid composition of the present invention.

(Composition of the Liquid Composition of the Present Invention)

The content of the fluoropolymer (H) is preferably from 1 to 50 mass %, more preferably from 3 to 30 mass %, in the liquid composition (100 mass %) of the present invention.

The content of trivalent or tetravalent cerium ions is from 1.6 to 23.3 mol %, preferably from 3.3 to 16.7 mol %, more preferably from 3.3 to 10 mol %, to the sulfonic acid groups (100 mol %) in the fluoropolymer (H). When the content of cerium ions is at least 1.6 mol %, it is possible to prevent the deterioration of the fluoropolymer (H) by hydrogen peroxide or peroxide radicals. Further, it is possible to prevent poisoning of the catalyst by decomposed products of the fluoropolymer (H). When the content of cerium ions is at most 23.3 mol %, the proportion of protons in the fluoropolymer (H) to be ion-exchanged, is reduced, whereby it is possible to sufficiently secure the proton conductivity of the catalyst layer.

(Method for Producing the Liquid Composition of the Present Invention)

The method for producing the liquid composition of the present invention is a method of mixing a liquid medium, the fluoropolymer (H) and a cerium compound.

The method for producing the liquid composition of the present invention may, for example, be a method having the following step (x) and step (y).

(x) A step of dispersing the fluoropolymer (H) in a liquid medium to prepare a fluoropolymer (H) dispersion.

(y) A step of adding a cerium compound to the fluoropolymer (H) dispersion to prepare the liquid composition.

Step (x):

The liquid medium and the fluoropolymer (H) are mixed, and under the atmospheric pressure or in a sealed state in an autoclave or the like, shearing by e.g. stirring is exerted to the fluoropolymer (H) in the liquid medium. The liquid medium may be mixed with the fluoropolymer (H) all at once, or may be mixed with the fluoropolymer (H) dividedly in a plurality of times. The preparation temperature is preferably from 0 to 250° C., more preferably from 20 to 150° C. If necessary, it is also possible to impart shearing such as ultrasonic waves.

As the fluoropolymer (H), it is preferred to use one wherein the remaining sulfate ion concentration is at most 30 ppm, and it is more preferred to use one wherein sulfate ion the remaining sulfate ion concentration is at most 10 ppm. When the sulfate ion concentration remaining in the fluorine-containing polymer (H) is at most 30 ppm, it is possible to more efficiently prevent the poisoning of the catalyst.

As a method for reducing the sulfate ion concentration remaining in the fluoropolymer (H), a method of preliminarily washing the fluoropolymer (H) with water is preferred. From such a viewpoint that the effect for reducing the sulfate ion concentration is high, more preferred is a method of preliminarily washing the fluoropolymer (H) with water of at least 50° C., and further preferred is a method of preliminarily washing the fluoropolymer (H) with water of at least 70° C.

Step (y):

A cerium compound is added to the fluoropolymer (H) dispersion, and under the atmospheric pressure or in a sealed state in e.g. an autoclave, shearing by e.g. stirring is exerted to the cerium compound in the fluoropolymer (H) dispersion. The fluoropolymer (H) dispersion may be mixed with the cerium compound all at once, or it may be mixed with the cerium compound dividedly in a plurality of times. The preparation temperature is preferably from 0 to 250° C., more preferably from 20 to 150° C. If necessary, it is also possible to impart shearing by e.g. ultrasonic waves.

The liquid composition of the present invention comprises a liquid medium, a fluoropolymer (H) having sulfonic acid groups and ring structures, and trivalent or tetravalent cerium ions, and the content of cerium ions is from 1.6 to 23.3 mol %, to the sulfonic acid groups (100 mol %), whereby it is possible to effectively prevent deterioration of the fluoropolymer (H) by hydrogen peroxide or by peroxide radicals.

Further, in the catalyst layer, cerium ions will inhibit poisoning of the catalyst by decomposed products (such as sulfate ions) of the fluoropolymer (H). As a result, it is possible to form a catalyst layer which is excellent in resistance to hydrogen peroxide or peroxide radicals, and which is capable of further increasing the output voltage of the membrane/electrode assembly, and capable of maintaining the high output voltage over a long period of time. Such effects appear remarkably when the fluoropolymer having sulfonic acid groups is a fluoropolymer (H) having a ring structure. Whereas, in the case of a conventional fluoropolymer having no such a ring structure, such effects are small.

<Membrane/Electrode Assembly>

FIG. 1 is a schematic sectional view showing an example of the membrane/electrode assembly for a polymer electrolyte fuel cell of the present invention (hereinafter referred to as the membrane/electrode assembly). The membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in such a state that it is in contact with the catalyst layers 11.

(Catalyst Layer)

The catalyst layer 11 is a layer containing a catalyst and an ion exchange resin. The catalyst may, for example, be a supported catalyst having platinum or a platinum alloy supported on a carbon carrier. The carbon carrier may be carbon black powder.

The ion-exchange resin may, for example, be the above-mentioned fluoropolymer (H) or a known ion-exchange resin, and the ion exchange resin contained in the catalyst layer of at least one of the cathode and the anode is the fluoropolymer (H); it is preferred that the ion exchange resin contained in the cathode catalyst layer is the fluoropolymer (H); and it is more preferred that the ion exchange resin contained in catalyst layer in each of the cathode and the anode, is the fluoropolymer (H).

The catalyst layer 11 may contain a water repellent agent, since the effect of suppressing flooding is thereby enhanced. The water-repellent agent may, for example, be a tetrafluoroethylene-hexafluoropropylene copolymer, a tetrafluoroethylene-perfluoro(alkyl vinyl ether) copolymer, or polytetrafluoroethylene. As the water-repellent agent, a fluoropolymer that can be dissolved in a solvent is preferred, since it is thereby easy to treat the catalyst layer 11 for water-repellency. The amount of the water repellent agent is preferably from 0.01 to 30 mass % in the catalyst layer 11 (100 mass %).

(Gas Diffusion Layer)

The gas diffusion layer 12 has a function to uniformly disperse gas to the catalyst layer 11 and a function as a current collector. The gas diffusion layer 12 may, for example, be carbon paper, carbon cloth or carbon felt. The gas diffusion layer 12 is preferably treated for water repellency with e.g. polytetrafluoroethylene.

(Carbon Layer)

Figure 2:
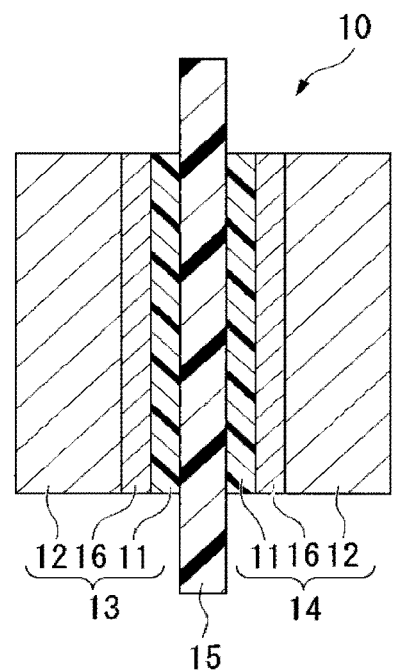
FIG. 2 is a schematic sectional view showing another example of the membrane/electrode assembly for a polymer electrolyte fuel cell.

The membrane/electrode assembly 10 may have a carbon layer 16 between the catalyst layer 11 and the gas diffusion layer 12, as shown in FIG. 2. By disposing the carbon layer 16, it is possible to improve the gas diffusion property on the surface of the catalyst layer 11 and to substantially improve the power generation performance of the polymer electrolyte fuel cell.

The carbon layer 16 is a layer containing carbon and a nonionic fluoropolymer. The carbon is preferably a carbon nanofiber having a diameter of from 1 to 1,000 nm and a fiber length of at most 1,000 µm. The nonionic fluoropolymer may, for example, be polytetrafluoroethylene.

(Polymer Electrolyte Membrane)

The polymer electrolyte membrane 15 is a membrane containing an ion exchange resin.

The ion-exchange resin may, for example, be the above-mentioned fluoropolymer (H) or a known ion exchange resin. The known ion-exchange resin may, for example, be a fluoropolymer obtained by converting —$SO_2F$ groups in a polymer having a structural unit derived from a compound (a1) and a structural unit derived from TFE, to sulfonic acid groups.

The polymer electrolyte membrane 15 may be reinforced with a reinforcing material. As the reinforcing material, porous materials, fibers, woven fabrics, nonwoven fabrics, etc. may be mentioned. As the material for the reinforcing material, polytetrafluoroethylene, a tetrafluoroethylene-hexafluoropropylene copolymer, a tetrafluoroethylene-perfluoro(alkyl vinyl ether) copolymer, polyethylene, polypropylene, polyphenylene sulfide, etc. may be mentioned.

The polymer electrolyte membrane 15 may contain at least one type of atoms selected from the group consisting of cerium and manganese, in order to further improve the durability. Cerium or manganese will decompose hydrogen peroxide as a material to cause deterioration of the polymer electrolyte membrane 15. Cerium or manganese is preferably present in the form of ions in the polymer electrolyte membrane 15, and may be present in any state in the polymer electrolyte membrane 15 so long as it is present in the form of ions.

The polymer electrolyte membrane 15 may contain silica or a heteropoly acid (such as zirconium phosphate, phosphomolybdic acid or phosphotungstic acid), as a water retention agent to prevent drying.

(Method for Producing the Membrane/Electrode Assembly)

The membrane/electrode assembly 10 may be produced, for example, by the following methods.

(α) a method of forming catalyst layers 11 on a polymer electrolyte membrane 15 to form a membrane/catalyst layer assembly, and sandwiching the membrane/catalyst layer assembly between gas diffusion layers 12.

(β) a method of forming catalyst layers 11 on gas diffusion layers 12 to form electrodes (an anode 13 and a cathode 14) and sandwiching a polymer electrolyte membrane 15 between the electrodes.

In a case where a membrane/electrode assembly 10 has carbon layers 16, such a membrane electrode assembly 10 may be produced, for example, by the following methods.

(γ) a method of coating a substrate film with a dispersion containing carbon and a nonionic fluoropolymer, followed by drying to form a carbon layer 16, forming a catalyst layer 11 on the carbon layer 16, then bonding the catalyst layer 11 and a polymer electrolyte membrane 15, followed by peeling off the substrate film to obtain a membrane/catalyst layer assembly having carbon layers 16, and sandwiching the membrane/catalyst layer assembly between gas diffusion layers 12.

(δ) a method of coating a gas diffusion layer 12 with a dispersion containing carbon and a nonionic fluoropolymer, followed by drying to form a carbon layer 16, and sandwiching a membrane/catalyst layer assembly having catalyst layers 11 formed on a polymer electrolyte membrane 15, between the gas diffusion layers 12 having carbon layers 16.

As a method for forming the catalyst layer 11, the following methods may be mentioned.

(ε) a method of applying a catalyst layer forming coating liquid onto a polymer electrolyte membrane 15, a gas diffusion layer 12 or a carbon layer 16, followed by drying.

(ζ) a method of applying a catalyst layer forming coating liquid onto a substrate film, followed by drying to form a catalyst layer 11, and transferring the catalyst layer 11 on a polymer electrolyte membrane 15.

The catalyst layer forming coating liquid may be prepared by mixing a liquid composition containing an ion exchange resin, and a dispersion of a catalyst.

In the present invention, at the time of forming at least one of the catalyst layers 11 for the cathode 14 and the anode 13, a catalyst layer forming coating liquid having a catalyst and the liquid composition of the present invention mixed, is used. It is preferred to use the catalyst layer forming coating liquid having a catalyst and the liquid composition of the present invention mixed, at the time of forming the catalyst layer 11 for the cathode 14, and it is more preferred to use the catalyst layer forming coating liquid having a catalyst and the liquid composition of the present invention mixed, at the time of forming the catalyst layer 11 for each of the cathode 14 and the anode 13.

The polymer electrolyte membrane 15 may be formed, for example, by a method (casting method) of applying a liquid composition containing an ion-exchange resin onto a substrate film or a catalyst layer 11, followed by drying.

In the present invention, at the time of forming a polymer electrolyte membrane 15, it is preferred to use a liquid composition comprising a liquid medium, a fluoropolymer having sulfonic acid groups, and trivalent or tetravalent cerium ions. The content of cerium ions is preferably from 1 to 10 mol %, more preferably from 2 to 5 mol %, to the sulfonic acid groups (100 mol %) in the fluoropolymer having sulfonic acid groups.

In order to stabilize the polymer electrolyte membrane 15, it is preferred to carry out heat treatment. The heat treatment temperature is preferably from 130 to 200° C., although it may depend on the type of the ion exchange resin. When the temperature for heat treatment is at least 130° C., the ion exchange resin will not be excessively hydrated. When the temperature for heat treatment is at most 200° C., thermal decomposition of the sulfonic acid groups will be suppressed, and reduction of proton conductivity of the polymer electrolyte membrane 15 will be suppressed. The polymer electrolyte membrane 15 may be treated with hydrogen peroxide, as the case requires.

In the method for producing the membrane/electrode assembly of the present invention, the liquid composition of the present invention and a catalyst are mixed to prepare a catalyst layer forming coating liquid, and by using the coating liquid, at least one of catalyst layers for the cathode and the anode, is formed, whereby it is possible to efficiently prevent deterioration of the fluoropolymer (H) by hydrogen peroxide or peroxide radicals. Further, in the catalyst layer, the cerium ions will inhibit poisoning of the catalyst by the decomposed products (such as sulfate ions) of the fluoropolymer (H). As a result, it is possible to produce a membrane/electrode assembly provided with a catalyst layer excellent in resistance to hydrogen peroxide or peroxide radicals, whereby the output voltage is further increased, and it is possible to maintain the high output voltage over a long period of time. Such effects appear remarkably when the fluoropolymer having sulfonic acid groups is a fluoropolymer (H) having a ring structure. Whereas, in the case of a conventional fluoropolymer having no ring structure, such effects are small.

Further, when a polymer electrolyte membrane is formed by using a liquid composition comprising a liquid medium, a fluoropolymer having sulfonic acid groups, and trivalent or tetravalent cerium ions, cerium ions in the catalyst layer tend to be hardly diffused to the polymer electrolyte membrane. Therefore, the above-mentioned effects by cerium ions in the catalyst layer are less likely to decrease.

<Polymer Electrolyte Fuel Cell>

It is possible to obtain a polymer electrolyte fuel cell by disposing a separator having grooves formed to serve as gas passages, on both sides of the membrane/electrode assembly.

The separator may be a separator made of various conductive material, such as a metal separator, a carbon separator, or a separator made of a material obtained by mixing graphite and a resin.

In the polymer electrolyte fuel cell, power generation is carried out by supplying a gas containing oxygen to the cathode, and a gas containing hydrogen to the anode.

Further, the membrane/electrode assembly can be applied also to a methanol fuel cell for generating electric power by supplying methanol to the anode.

EXAMPLES

Now, the present invention will be described in detail with reference to Examples, but the present invention is by no means limited by these Examples. Here, Ex. 1 to 7, and Ex. 13 to 21 are Examples of the present invention, and Ex. 8 to 12, and Ex. 22 to 25 are Comparative Examples.

(Ion Exchange Capacity)

The ion exchange capacity of a fluoropolymer having sulfonic acid groups was obtained by the following method.

An ion-exchange resin was put in a glove box flushed with dry nitrogen, and after 24 hours, the dried mass of the ion exchange resin was measured. Thereafter, the ion exchange resin was immersed in a 2 mol/L sodium chloride aqueous solution at 60° C. for 1 hour. After washing the ion exchange resin with ultra-pure water, it was taken out, and by titrating the solution in which the ion exchange resin was immersed, with a 0.1 mol/L sodium hydroxide aqueous solution, the ion exchange capacity of the ion exchange resin was obtained.
(Sulfate Ion Concentration in Fluoropolymer (H))

The sulfate ion concentration in a fluoropolymer (H) was obtained by the following method.

1 g of the fluoropolymer (H) was put in a glove box flushed with dry nitrogen, after 24 hours, the dried mass of the fluoropolymer (H) was measured. Thereafter, the fluoropolymer (H) was immersed in 25 mL of warm water at 80° C. for 48 hours, to extract the sulfate ions in the fluoropolymer (H). The sulfate ion concentration in the extract solution was quantified by ion chromatography to obtain the sulfate ion concentration in the fluoropolymer (H).
(Sulfate Ion Concentration in Liquid Composition)

The sulfate ion concentration in the liquid composition was obtained by the following method.

A liquid composition was cast on a polytetrafluoroethylene sheet, then heated at 80° C. for 30 minutes to remove the solvent, and further heated at 180° C. for 30 minutes to obtain a film-form fluoropolymer (H). By the same method as the above-described method for measuring the sulfuric ion concentration in the fluoropolymer (H), the sulfate ion concentration in the film-form fluoropolymer (H) was quantified. And, from the fluoropolymer (H) concentration in the liquid composition, the sulfate ion concentration in the liquid composition was obtained.
(Power Generation Characteristics)

A membrane/electrode assembly was assembled into a cell for power generation, and while maintaining the temperature of the membrane/electrode assembly at 80° C., hydrogen (utilization rate of 70%) to the anode, and air (utilization rate of 50%) to the cathode, were supplied, respectively, under a pressure of 151 kPa (absolute pressure). Humidification of the gases was a relative humidity of 100% RH for both of the hydrogen and the air, and the cell voltage at a current density of 0.1 A/cm² was recorded and evaluated by the following standards.

⊚⊚: The cell voltage is at least 0.845 V.

⊚: The cell voltage is at least 0.835 V and less than 0.845 V.

○: The cell voltage is at least 0.825 V and less than 0.835 V.

x: The cell voltage is at least 0.815 V and less than 0.825 V.

xx: The cell voltage is less than 0.815 V.
<Polymerization for Fluoropolymer, and Preparation of Liquid Composition>
(Radical Initiator)

Compound (i-1): $(C_3F_7CO)_2$ (i-1).

Compound (i-2): $((CH_3)_2CHOCOO)_2$ (i-2).

(Solvent)

Compound (s-1): $CClF_2CF_2CHClF$ (s-1).

Compound (s-2): $CH_3CCl_2F$ (s-2).

Ex. 1

In a stainless steel autoclave having an internal capacity of 125 mL, monomer (a1-1): 108.14 g of PSVE, monomer (b2-1): 16.02 g of PDD and 37.7 mg of the compound (i-2), were charged and thoroughly degassed under cooling by liquid nitrogen.

Thereafter, 3.69 g of TFE was charged, the temperature was raised to 40° C., and after stirring 24 hours, the reaction was stopped by cooling the autoclave.

After diluting the product with the compound (s-1), n-hexane was added thereto to coagulate the polymer, followed by filtration. Then, the polymer was stirred in the compound (s-1), re-coagulated by n-hexane, and dried under reduced pressure overnight at 80° C., to obtain a polymer (F-1). The yield was 20.09 g.

The polymer (F-1) was immersed at 80° C. for 16 hours in an aqueous solution containing of 20 mass % of methanol and 15 mass % of potassium hydroxide, to hydrolyze and convert —$SO_2F$ in the polymer (F-1) to —$SO_3K$. Then, the polymer was immersed in a 3 mol/L hydrochloric acid aqueous solution for 2 hours. By replacing the aqueous hydrochloric acid solution, the same treatment was repeated four more times. The polymer was thoroughly washed with ultrapure water warmed to 50° C., to obtain an acid form fluoropolymer (H1-1) having —$SO_3K$ in said polymer converted to sulfonic acid groups. The ion exchange capacity of the fluoropolymer (H1-1) was 1.1 meq/g dry resin, and the sulfate ion concentration was 19 ppm.

A liquid composition (L-1) in which cerium ions (trivalent) were added in an amount of 10 mol % to the number (100 mol %) of sulfonic acid groups in the fluoropolymer (H1-1), was prepared as follows.

To the fluoropolymer (H1-1), a mixed solvent of ethanol and water (ethanol/water=80/20 mass ratio) was added, followed by stirring at 105° C. for 8 hours by means of an autoclave, to obtain a fluoropolymer (H1-1) dispersion having the solid content concentration adjusted to 10 mass %.

To 50 g of the fluoropolymer (H1-1) dispersion, 0.166 g of cerium carbonate hydrate $(Ce_2(CO_3)_3 \cdot 8H_2O)$ was added and stirred at 50° C. for 24 hours. Bubbles due to $CO_2$ generation were observed from the start of the stirring. A uniform and transparent liquid composition (L-1) was obtained. The sulfate ion concentration in the liquid composition (L-1) was 2 ppm. The results are shown in Table 1.

Ex. 2

In a stainless steel autoclave having an internal capacity of 125 mL, monomer (a2-1): 132.71 g of BSVE2E, monomer (b1-1): 6.46 g of MMD and 41.78 mg of the compound (i-1) were charged and thoroughly degassed under cooling by liquid nitrogen. Then, 2.25 g of TFE was charged, the temperature was raised to 21° C., and after stirring for 21 hours, the reaction was stopped by cooling the autoclave.

After diluting the product with the compound (s-1), n-hexane was added thereto to coagulate the polymer, followed by filtration. Then, the polymer was stirred in the compound (s-1), re-coagulated by n-hexane, and dried at 80° C. under reduced pressure overnight, to obtain a polymer (F-2). The yield was 12.15 g.

In the same manner as in Ex. 1, hydrolysis and acid form treatment were carried out to obtain a fluoropolymer (H1-2). The ion exchange capacity of the fluoropolymer (H1-2) was 1.5 meq/g dry resin, and the sulfate ion concentration was 17 ppm.

In the same manner as in Ex. 1, a mixed solvent of ethanol and water (ethanol/water=50/50 mass ratio) was added to obtain a polymer (H1-2) dispersion having a solid content concentration of 20 mass %. Further, a liquid composition (L-2) was obtained in the same manner as in Ex. 1 except that the amount of cerium carbonate hydrate was changed to 0.453 g. The sulfate ion concentration in the liquid composition (L-2) was 3.5 ppm. The results are shown in Table 1.

Ex. 3

In a stainless steel autoclave having an internal capacity of 125 mL, monomer (a2-1): 52.52 g of BSVE2E, monomer (b2-1): 9.04 g of PDD and 18.7 mg of the compound (i-1) were charged, and thoroughly degassed under cooling by liquid nitrogen. Then, 2.53 g of TFE was charged, the temperature was raised to 22° C., and after stirring for 24 hours, the reaction was stopped by cooling the autoclave.

After diluting the product with the compound (s-1), n-hexane was added to coagulate the polymer, followed by filtration. Then, the polymer was stirred in the compound (s-1), re-coagulated by n-hexane and dried at 80° C. under reduced pressure overnight, to obtain a polymer (F-3). The yield was 14.03 g.

In the same manner as in Ex. 1, hydrolysis and acid form treatment were carried out to obtain a fluoropolymer (H1-3). The ion exchange capacity of the fluoropolymer (H1-3) was 1.5 meq/g dry resin, and the sulfate ion concentration was 16 ppm.

In the same manner as in Ex. 1, a mixed solvent of ethanol and water (ethanol/water=40/60 mass ratio) was added to obtain a polymer (H1-3) dispersion having a solid content concentration of 10 mass %. Further, a liquid composition (L-3) was obtained in the same manner as in Ex. 1 except that the amount of cerium carbonate hydrate was changed to 0.227 g. The sulfate ion concentration in the liquid composition (L-3) was 2 ppm. The results are shown in Table 1.

Ex. 4

A liquid composition (L-4) was obtained in the same manner as in Ex. 3, except that the amount of cerium carbonate hydrate was changed to 0.378 g. The sulfate ion concentration in the liquid composition (L-4) was 2 ppm. The results are shown in Table 1.

Ex. 5

A fluoropolymer (H1-1') was obtained in the same manner as in Ex. 1, except that the temperature of the ultrapure water used for washing after the hydrolysis and acid-form treatment, was changed to 80° C. The sulfate ion concentration in the fluoropolymer (H1-1') was 7 ppm.

Further, a liquid composition (L-5) was obtained in the same manner as in Ex. 1 except that the amount of cerium carbonate hydrate was changed to 0.227 g. The sulfate ion concentration in the liquid composition (L-5) was 0.7 ppm. The results are shown in Table 1.

Ex. 6

A fluoropolymer (H1-3') was obtained in the same manner as in Ex. 3, except that the temperature of the ultrapure water used for washing after the hydrolysis and acid-form treatment, was changed to 80° C. The sulfate ion concentration in the fluoropolymer (H1-3') was 8 ppm.

Further, a liquid composition (L-6) was obtained in the same manner as in Ex. 3 except that the amount of cerium carbonate hydrate was changed to 0.378 g. The sulfate ion concentration in the liquid composition (L-6) was 0.8 ppm. The results are shown in Table 1.

Ex. 7

A liquid composition (L-7) was obtained in the same manner as in Ex. 6 except that in Ex. 6, the amount of cerium carbonate hydrate was changed to 0.076 g. The sulfate ion concentration in the liquid composition (L-7) was 0.8 ppm. The results are shown in Table 1.

Ex. 8

A liquid composition (L-8) was obtained in the same manner as in Ex. 1 except that in Ex. 1, the amount of cerium carbonate hydrate was changed to 0.014 g. The sulfate ion concentration in the liquid composition (L-8) was 0.8 ppm. The results are shown in Table 1.

Ex. 9

A liquid composition (L-9) was obtained in the same manner as in Ex. 1 except that in Ex. 1, the amount of cerium carbonate hydrate was changed to 0.443 g. However, the amount of cerium carbonate hydrate was too large, whereby the polymer precipitated in the liquid, and it was not possible to obtain a stable liquid composition.

Ex. 10

A fluoropolymer (H1-3") was obtained in the same manner as in Ex. 3, except that the temperature of the ultrapure water used for washing after the hydrolysis and acid-form treatment, was changed to 20° C. The sulfate ion concentration in the fluoropolymer (H1-3") was 50 ppm. Further, a liquid composition (L-10) was obtained in the same manner as in Ex. 3 except that the amount of cerium carbonate hydrate was changed to 0.019 g. The sulfate ion concentration in the liquid composition (L-10) was 5 ppm. The results are shown in Table 1.

Ex. 11

In a stainless steel autoclave having an inner volume of 125 mL, 49.64 g of the monomer (a1-1), 28.22 g of the compound (s-1) and 38.9 mg of the compound (i-2) dissolved at a concentration of 3.2 mass % in the compound (s-1), were charged, and thoroughly degassed under cooling with liquid nitrogen. Thereafter, the temperature was raised to 30° C., and TFE was introduced into the system, to maintain the pressure to be 0.37 MPaG. After stirring for 4.8 hours, the reaction was stopped by cooling the autoclave.

After diluting the product with the compound (s-1), the compound (s-2) was added thereto to coagulate the polymer, followed by filtration. Thereafter, the polymer was stirred in the compound (s-1), re-coagulated by the compound (s-2) and dried at 80° C. under reduced pressure overnight, to obtain a polymer (F-4). The yield was 15.0 g.

By carrying out the hydrolysis and acid-form treatment in the same manner as in Ex. 1, a fluoropolymer (H'-4) was obtained. The ion exchange capacity of the fluoropolymer (H'-4) was 1.1 meq/g dry resin, and the sulfate ion concentration was 17 ppm.

In the same manner as in Ex. 1, a mixed solvent of ethanol and water (ethanol/water=60/40 mass ratio) was added to obtain a polymer (H'-4) dispersion having a solid content concentration of 20 mass %. Further, a liquid composition (L-11) was obtained in the same manner as in Ex. 1 except that the amount of cerium carbonate hydrate was changed to 0.554 g. The sulfate ion concentration in the liquid composition (L-11) was 3.5 ppm. The results are shown in Table 1.

Ex. 12

A liquid composition (L-12) was obtained in the same manner as in Ex. 11 except that cerium carbonate hydrate was not added in Ex. 11. The sulfate ion concentration in the liquid composition (L-12) was 3.5 ppm. The results are shown in Table 1.

TABLE 1

| | Fluoropolymer having sulfonic acid groups | | Liquid composition | |
|---|---|---|---|---|
| Ex. | Type | Sulfuric acid ion concentration (ppm) | Cerium ion content to sulfonic acid groups (mol %) | Sulfuric acid ion concentration (ppm) |
| 1 | H1-1 | 19 | 10 | 2 |
| 2 | H1-2 | 17 | 10 | 3.5 |
| 3 | H1-3 | 16 | 10 | 2 |
| 4 | H1-3 | 16 | 16.7 | 2 |
| 5 | H1-1' | 7 | 16.7 | 0.7 |
| 6 | H1-3' | 8 | 16.7 | 0.8 |
| 7 | H1-3' | 8 | 3.3 | 0.8 |
| 8 | H1-1 | 19 | 0.83 | 0.8 |
| 9 | H1-1 | 19 | 26.7 | — |
| 10 | H1-3" | 50 | 0.83 | 5 |
| 11 | H'-4 | 17 | 16.7 | 3.5 |
| 12 | H'-4 | 17 | 0 | 3.5 |

(Preparation of Polymer Electrolyte Membrane)

The polymer (H'-4) dispersion was applied onto an ETFE sheet by a die coater, then dried at 80° C. for 30 minutes in an oven and further subjected to heat treatment at 190° C. for 30 minutes, to obtain a polymer electrolyte membrane (M-1) having a thickness of 25 μm. The concentration of volatile organic compounds (VOC) in the oven chamber used for drying and heat-treatment, was 300 ppm. For the measurement of the VOC concentration, VOC-1 (catalytic oxidation detector tube system) manufactured by Komyo Rikagaku Kogyo K.K. was used.

To the polymer (H'-4) dispersion, 0.066 g of cerium carbonate hydrate was added so that the content of cerium ions would be 2 mol % relative to sulfonic acid groups in the polymer (H'-4), and a liquid composition was prepared in the same manner as in Ex. 1. The application, drying and heat treatment were carried out in the same manner as described above, to obtain a polymer electrolyte membrane (M-2) having a thickness 25 μm.

To the polymer (H'-4) dispersion, 0.166 g of cerium carbonate hydrate was added so that the content of cerium ions would be 5 mol % relative to sulfonic acid groups in the polymer (H'-4), and a liquid composition was prepared in the same manner as in Ex. 1. The application, drying and heat treatment were carried out in the same manner as described above, to obtain a polymer electrolyte membrane (M-3) having a thickness 25 μm.

Ex. 13

24.2 g of water and 12.5 g of ethanol are added to 5 g of a supported catalyst (manufactured by Tanaka Kikinzoku Co., Ltd.) having 20 mass % of platinum supported on carbon powder, and the mixture is pulverized by a planetary ball mill to obtain a dispersion of the catalyst. To the dispersion of the catalyst, 32.4 g of the liquid composition (L-1) is added, and further, 17.2 g of water and 11.6 g of ethanol are added, followed by mixing by using a planetary ball mill to bring the solid content concentration to be 8 mass % thereby to obtain an anode catalyst layer forming coating liquid. The liquid is applied onto an ETFE sheet by a bar coater and dried at 80° C. for 10 minutes, and further subjected to heat treatment at 160° C. for 30 minutes, to form an anode catalyst layer having an amount of platinum being 0.05 mg/cm².

16.2 g of water, 10.7 g of ethanol and 4.4 g of the liquid composition (L-1) are added to 5 g of a supported catalyst (manufactured by Tanaka Kikinzoku Co., Ltd.) having 56.7 mass % of platinum and 6.4 mass % of cobalt supported on carbon powder, followed by mixing and pulverization by using a planetary ball mill to obtain a dispersion of the catalyst. To the dispersion of the catalyst, 10.3 g of the liquid composition (L-1) is added, and further, 10.3 g of water and 7.8 g of ethanol are added, followed by mixing by using a planetary ball mill, to bring the solid content concentration to be 10 mass % thereby to obtain a cathode catalyst layer forming coating liquid. The liquid is applied onto an ETFE sheet by a bar coater, then dried at 80° C. for 10 minutes, and further subjected to heat treatment at 160° C. for 30 minutes, to form a cathode catalyst layer having an amount of platinum being 0.2 mg/cm².

A polymer electrolyte membrane (M-1) is sandwiched by an anode catalyst layer and the cathode catalyst layer, respectively, from both sides, and heat-pressed under conditions of a pressing temperature of 160° C., a pressing time of 2 minutes and a pressure of 3 MPa, to bond the catalyst layers on both surfaces of the polymer electrolyte membrane, and the ETFE films are peeled off from the catalyst layers to obtain a membrane/catalyst layer assembly having an electrode area of 25 cm²

Carbon layer-attached gas diffusion substrates (manufactured by NOK Corporation, trade name: X0086 IX92 CX320) are disposed on both anode and cathode so that the carbon layers are in contact with the catalyst layers of the membrane/catalyst layer assembly, and the membrane/catalyst layer assembly is sandwiched between the gas diffusion layers, to prepare a membrane/electrode assembly, whereupon the power generation characteristics are evaluated. The evaluation results are shown in Table 2.

Ex. 14

24.2 g of water and 12.5 g of ethanol are added to 5 g of a supported catalyst (manufactured by Tanaka Kikinzoku Co., Ltd.) having 20 mass % of platinum supported on carbon powder, followed by mixing and pulverization by using a planetary ball mill, to obtain a dispersion of the catalyst. To the dispersion of the catalyst, 16.0 g of the liquid composition (L-2) is added, and further 16.6 g of water and 28.3 g of ethanol are added, followed by mixing by using a planetary ball mill, to bring the solid content concentration to be 8 mass % thereby to obtain an anode catalyst layer forming coating liquid. The liquid is applied onto an ETFE sheet by a bar coater, dried at 80° C. for 10 minutes, and further subjected to heat treatment at 160° C. for 30 minutes, to form an anode catalyst layer having an amount of platinum being 0.05 mg/cm².

16.1 g of water, 13.0 g of ethanol and 2.2 g of the liquid composition (L-2) are added to 5 g of a supported catalyst (manufactured by Tanaka Kikinzoku Co., Ltd.) having 56.7 mass % of platinum and 6.4 mass % of cobalt supported on carbon powder, followed by mixing and pulverization by using a planetary ball mill to obtain a dispersion of the catalyst. To the dispersion of the catalyst, 5.2 g of the liquid composition (L-2) is added, and further 10.1 g of water and 13.2 g of ethanol are added, followed by mixing by using a planetary ball mill, to bring the solid content concentration to be 10 mass % thereby to obtain a cathode catalyst layer forming coating liquid. The liquid is applied onto an ETFE sheet by a bar coater, dried at 80° C. for 10 minutes, and further subjected to heat treatment at 160° C. for 30 minutes, to form a cathode catalyst layer having an amount of platinum being 0.2 mg/cm².

A membrane/electrode assembly is prepared in the same manner as in Ex. 13 except that the above anode catalyst layer and cathode catalyst layer are used, and the power generation characteristics are evaluated. The evaluation results are shown in Table 2.

Ex. 15

24.2 g of water and 12.5 g of ethanol were added to 5 g of a supported catalyst (manufactured by Tanaka Kikinzoku Co., Ltd.) having 20 mass % of platinum supported on carbon powder, and the mixture was pulverized by a planetary ball mill, to obtain a dispersion of the catalyst. To the dispersion of the catalyst, 32.1 g of the liquid composition (L-3) was added, and further 5.7 g of water and 23.2 g of ethanol were added, followed by mixing by using a planetary ball mill, to bring the solid content concentration to be 8 mass % thereby to obtain an anode catalyst layer forming coating liquid. The liquid was applied onto an ETFE sheet by a bar coater, dried at 80° C. for 10 minutes, and further subjected to heat treatment at 160° C. for 30 minutes, to form an anode catalyst layer having an amount of platinum being 0.05 mg/cm²

14.6 g of water, 12.3 g of ethanol and 4.4 g of the liquid composition (L-3) were added to 5 g of a supported catalyst (manufactured by Tanaka Kikinzoku Co., Ltd.) having 56.7 mass % of platinum and 6.4 mass % of cobalt supported on carbon powder, and the mixture was pulverized by a planetary ball mill to obtain a dispersion of the catalyst. To the dispersion of the catalyst, 10.3 g of the liquid composition (L-3) was added, and further 6.6 g of water and 11.5 g of ethanol were added, followed by mixing by using a planetary ball mill, to bring the solid content concentration to be 10 mass % thereby to obtain a cathode catalyst layer forming coating liquid. The liquid was applied onto an ETFE sheet by a bar coater, dried at 80° C. for 10 minutes, and further subjected to heat treatment at 160° C. for 30 minutes, to form a cathode catalyst layer having an amount of platinum being 0.2 mg/cm².

A membrane/electrode assembly was prepared in the same manner as in Ex. 13 except that the above anode catalyst layer and cathode catalyst layer were used, and the power generation characteristics were evaluated. The evaluation results are shown in Table 2.

Ex. 16

A membrane/electrode assembly was prepared in the same manner as in Ex. 15 except that (L-4) was used as a liquid composition to be used for the anode catalyst layer and cathode catalyst layer, and the power generation characteristics were evaluated. The evaluation results are shown in Table 2.

Ex. 17

A membrane/electrode assembly was prepared in the same manner as in Ex. 13 except that (L-5) was used as a liquid composition to be used for the anode catalyst layer and cathode catalyst layer, and the power generation characteristics were evaluated. The evaluation results are shown in Table 2.

Ex. 18

A membrane/electrode assembly was prepared in the same manner as in Ex. 15 except that (L-6) was used as a liquid composition to be used for the anode catalyst layer and cathode catalyst layer, and the power generation characteristics were evaluated. The evaluation results are shown in Table 2.

Ex. 19

A membrane/electrode assembly was prepared in the same manner as in Ex. 15 except that (L-7) was used as a liquid composition to be used for the anode catalyst layer and cathode catalyst layer, and the power generation characteristics were evaluated. The evaluation results are shown in Table 2.

Ex. 20

A membrane/electrode assembly was prepared in the same manner as in Ex. 15 except that (L-7) was used as a liquid composition to be used for the anode catalyst layer and cathode catalyst layer, and (M-2) was used as a polymer electrolyte membrane, and the power generation characteristics were evaluated. The evaluation results are shown in Table 2.

Ex. 21

A membrane/electrode assembly was prepared in the same manner as in Ex. 15 except that (L-7) was used as a liquid composition to be used for the anode catalyst layer and cathode catalyst layer, and (M-3) was used as a polymer electrolyte membrane, and the power generation characteristics were evaluated. The evaluation results are shown in Table 2.

Ex. 22

A membrane/electrode assembly was prepared in the same manner as in Ex. 13 except that (L-8) was used as a liquid composition to be used for the anode catalyst layer and cathode catalyst layer, and the power generation characteristics were evaluated. The evaluation results are shown in Table 2.

Ex. 23

A membrane/electrode assembly was prepared in the same manner as in Ex. 15 except that (L-10) was used as a liquid composition to be used for the anode catalyst layer and cathode catalyst layer, and the power generation characteristics were evaluated. The evaluation results are shown in Table 2.

Ex. 24

24.2 g of water and 12.5 g of ethanol are added to 5 g of a supported catalyst (manufactured by Tanaka Kikinzoku Co., Ltd.) having 20 mass % of platinum supported on carbon powder, and the mixture is pulverized by a planetary ball mill, to obtain a dispersion of the catalyst. To the dispersion of the catalyst, 16.0 g of the liquid composition (L-11) is added, and further 17.9 g of water and 27.0 g of ethanol are added, followed by mixing by using a planetary ball mill, to bring the solid content concentration to be 8 mass % thereby to obtain an anode catalyst layer forming coating liquid. The liquid is applied onto an ETFE sheet by a bar coater, dried at 80° C. for 10 minutes, and further subjected to heat treatment at 160° C. for 30 minutes, to form an anode catalyst layer having an amount of platinum being 0.05 mg/cm².

16.3 g of water, 12.8 g of ethanol and 2.2 g of the liquid composition (L-3) are added to 5 g of a supported catalyst (manufactured by Tanaka Kikinzoku Co., Ltd.) having 56.7 mass % of platinum and 6.4 mass % of cobalt supported on carbon powder, and the mixture is pulverized by using a planetary ball mill to obtain a dispersion of the catalyst. To the dispersion of the catalyst, 5.2 g of the liquid composition (L-11) is added, and further, 10.5 g of water and 12.8 g of ethanol are added, followed by mixing by using a planetary ball mill, to bring the solid content concentration to 10 mass % thereby to obtain a cathode catalyst layer forming coating liquid. The liquid is applied onto an ETFE sheet by a bar coater, dried at 80° C. for 10 minutes, and further subjected to heat treatment at 160° C. for 30 minutes, to form a cathode catalyst layer having an amount of platinum being 0.2 mg/cm².

A membrane/electrode assembly is prepared in the same manner as in Ex. 13 except that the above anode catalyst layer and cathode catalyst layer are used, and the power generation characteristics are evaluated. The evaluation results are shown in Table 2.

Ex. 25

A membrane/electrode assembly was prepared in the same manner as in Ex. 24 except that (L-12) was used as a liquid composition to be used for the anode catalyst layer and cathode catalyst layer, and the power generation characteristics were evaluated. The evaluation results are shown in Table 2.

TABLE 2

| Ex. | Liquid composition to be used for catalyst layers | Polymer electrolyte membrane | Power generation characteristics |
|---|---|---|---|
| 13 | L-1 | M-1 | ○ |
| 14 | L-2 | M-1 | ○ |
| 15 | L-3 | M-1 | ⊙ |
| 16 | L-4 | M-1 | ⊙ |
| 17 | L-5 | M-1 | ⊙ |
| 18 | L-6 | M-1 | ⊙ ⊙ |
| 19 | L-7 | M-1 | ⊙ |
| 20 | L-7 | M-2 | ⊙ |
| 21 | L-7 | M-3 | ⊙ ⊙ |
| 22 | L-8 | M-1 | X |
| 23 | L-10 | M-1 | XX |
| 24 | L-11 | M-1 | X |
| 25 | L-12 | M-1 | XX |

INDUSTRIAL APPLICABILITY

The membrane/electrode assembly of the present invention is useful as a membrane/electrode assembly for a polymer electrolyte fuel cell capable of maintaining a high output voltage over a long period of time.

REFERENCE SYMBOLS

10: a membrane/electrode assembly, 11: a catalyst layer, 12: a gas diffusion layer, 13: an anode, 14: a cathode, 15: a polymer electrolyte membrane, 16: a carbon layer

What is claimed is:

1. A liquid composition comprising:
a liquid medium;
a fluoropolymer (H) which is a polymer in which all of hydrogen atoms bonded to carbon atoms are substituted by fluorine atoms, the fluoropolymer (H) having a sulfonic acid group and a ring structure; and
trivalent or tetravalent cerium ions, wherein a content of the trivalent or tetravalent cerium ions is from 1.6 to 23.3 mol % to the sulfonic acid groups (100 mol %) in the fluoropolymer (H), and an amount of a sulfate ion in the liquid composition is at most 30 ppm with respect to an amount of the fluoropolymer (H),
wherein the fluoropolymer (H) comprises a structural unit (A) comprising a sulfonic acid group and no ring structure, and a structural unit (B) comprising a ring structure and no sulfonic acid group,
the fluoropolymer (H) is obtained by a process comprising: polymerizing a monomer (a) which comprises —$SO_2F$ and no ring structure, and a monomer (b) which comprises the ring structure and no —$SO_2F$ to obtain a polymer (F); hydrolyzing —$SO_2F$ of the polymer (F) to obtain a salt form of the polymer (H); and subjecting the salt from of the polymer (H) to an acid treatment to obtain the polymer (H),
the structural unit (A) comprises at least one selected from the group consisting of a structural unit (A-1), a structural unit (A-2), and a structural unit (A-3), and the structural unit (B) comprises at least one selected from the group consisting of a structural unit (B-1), a structural unit (B-2), a structural unit (B-3), a structural unit (B-4), and a structural unit (B-5), the structural unit (B-5) being other than the structural units (B1) to (B4) and derived from a perfluoromonomer having at least two carbon-carbon double bonds with a polymerization reactivity and having a 5-membered ring,

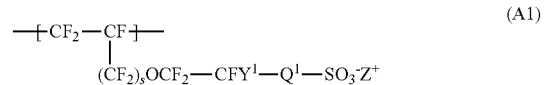
(A1)

wherein $Q^1$ is a single bond, or a perfluoroalkylene group which optionally have an etheric oxygen atom, $Y^1$ is a fluorine atom or a monovalent perfluoro organic group, s is 0 or 1, and $Z^+$ is $H^+$, a monovalent metal ion, or an ammonium ion in which one or more hydrogen atoms optionally be substituted by a hydrocarbon group,

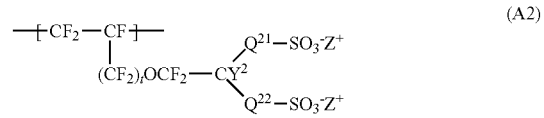
(A2)

wherein $Q^{21}$ is a perfluoroalkylene group which optionally have an etheric oxygen atom, $Q^{22}$ is a single bond, or a perfluoroalkylene group which optionally have an etheric oxygen atom, $Y^2$ is a fluorine atom or a monovalent perfluoro organic group, t is 0 or 1, and $Z^+$ is $H^+$, a monovalent metal ion, or an ammonium ion in which one or more hydrogen atoms optionally be substituted by a hydrocarbon group,

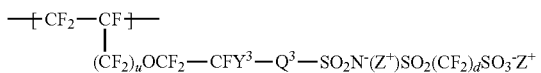

(A3)

wherein $Q^3$ is a single bond, or a perfluoroalkylene group which optionally have an etheric oxygen atom, $Y^3$ is a fluorine atom or a monovalent perfluoro organic group, u is 0 or 1, d is an integer of from 1 to 4, and $Z^+$ is $H^+$, a monovalent metal ion, or an ammonium ion in which one or more hydrogen atoms optionally be substituted by a hydrocarbon group,

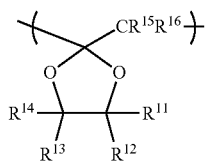

(B1)

wherein $R^{11}$ to $R^{16}$ are each independently a monovalent perfluoro organic group which optionally have an etheric oxygen atom, or a fluorine atom,

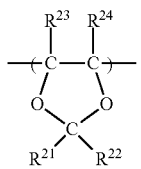

(B2)

wherein $R^{21}$ to $R^{22}$ are each independently a fluorine atom or a $C_{1-5}$ perfluoroalkyl group, and $R^{23}$ to $R^{24}$ are each independently a fluorine atom, a $C_{1-5}$ perfluoroalkyl group, or a $C_{1-5}$ perfluoroalkoxy group,

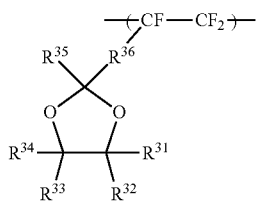

(B3)

wherein $R^{31}$ to $R^{35}$ are each independently a fluorine atom, a $C_{1-6}$ perfluoroalkyl group, or a $C_{2-6}$ perfluoroalkyl group having an etheric oxygen atom between carbon-carbon atoms,

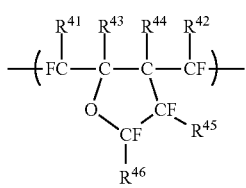

(B4)

wherein $R^{41}$ to $R^{46}$ are each independently a monovalent perfluoro organic group which optionally have an etheric oxygen atom, or a fluorine atom.

2. The liquid composition according to claim 1, wherein the amount of the fluoropolymer (H) is from 1 to 50 mass % in the liquid composition (100 mass %).

3. The liquid composition according to claim 1, wherein the structural unit (B) is represented by formula (B2-1):

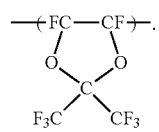

(B2-1)

4. The liquid composition according to claim 1, wherein the structural unit (A) is represented by formula (A2-1):

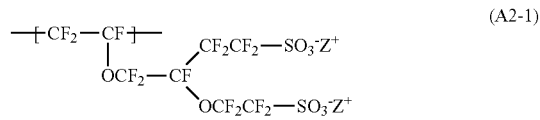

(A2-1)

wherein $Z^+$ is $H^+$, a monovalent metal ion, or an ammonium ion in which one or more hydrogen atoms optionally be substituted by a hydrocarbon group.

5. The liquid composition according to claim 1, wherein the liquid medium comprises an organic solvent comprising a hydroxy group.

6. The liquid composition according to claim 5, wherein the liquid medium further comprises water.

7. The liquid composition according to claim 6, wherein an amount of the water is from 40 to 99 mass % in the liquid medium.

8. The liquid composition according to claim 1, wherein the fluoropolymer (H) further comprises a structural unit (C) comprising a sulfonic acid group and a ring structure.

9. The liquid composition according to claim 1, wherein an ion exchange capacity of the fluoropolymer (H) is from 0.5 to 2.8 meq/g dry resin.

10. The liquid composition according to claim 1, wherein an ion exchange capacity of the fluoropolymer (H) is from 0.9 to 2.2 meq/g dry resin.

11. The liquid composition according to claim 1, wherein the amount of the fluoropolymer (H) is from 3 to 30 mass % in the liquid composition (100 mass %).

12. The liquid composition according to claim 1, wherein the content of the trivalent or tetravalent cerium ions is from 3.3 to 16.7 mol % to the sulfonic acid groups (100 mol %) in the fluoropolymer (H).

13. The liquid composition according to claim 1, wherein the content of the trivalent or tetravalent cerium ions is from 3.3 to 10 mol % to the sulfonic acid groups (100 mol %) in the fluoropolymer (H).

14. The liquid composition according to claim 1, wherein the amount of a sulfate ion in the liquid composition is at most 10 ppm with respect to the amount of the fluoropolymer (H).

15. A method for producing the liquid composition as defined in claim 1, comprising mixing components which comprises:
the liquid medium,
the fluoropolymer (H), and a cerium compound which is capable to generate the trivalent or tetravalent cerium ions, wherein an amount of a sulfate ion in the fluoropolymer (H) is at most 30 ppm.

16. The method according to claim 15, wherein the fluoropolymer (H) is washed with water of at least 50° C. before the components are mixed.

17. The method according to claim 15, wherein the fluoropolymer (H) is washed with water of at least 70° C. before the components are mixed.

18. A method for producing a membrane/electrode assembly for a polymer electrolyte fuel cell which comprises: an anode having a catalyst layer, a cathode having a catalyst layer, and a polymer electrolyte membrane disposed between the anode and the cathode, the method comprising: mixing the liquid composition as defined in claim 1 and a catalyst to prepare a coating liquid for forming a catalyst layer; and forming a catalyst layer for at least one of the cathode and the anode by using the coating liquid.

19. The method according to claim 18, wherein the polymer electrolyte membrane is formed by using a liquid composition comprising a liquid medium, a fluoropolymer and trivalent or tetravalent cerium ions.

\* \* \* \* \*